(12) United States Patent
Riegel et al.

(10) Patent No.: US 7,916,757 B2
(45) Date of Patent: *Mar. 29, 2011

(54) STACKABLE ROUTERS EMPLOYING A ROUTING PROTOCOL

(75) Inventors: Jane A. Riegel, Marlborough, MA (US); Jacek A. Tulacz, Marlborough, MA (US); John M. Livingston, Ayer, MA (US); Kin Moon Leung, Newton, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 12/329,776

(22) Filed: Dec. 8, 2008

(65) Prior Publication Data

US 2009/0129398 A1    May 21, 2009

Related U.S. Application Data

(63) Continuation of application No. 10/744,974, filed on Dec. 22, 2003, now Pat. No. 7,463,654.

(51) Int. Cl.
*H04L 12/50* (2006.01)
(52) U.S. Cl. ........................................ 370/503
(58) Field of Classification Search .................. 370/503, 370/507, 509–512
See application file for complete search history.

(56) References Cited

U.S. PATENT DOCUMENTS

| | | | |
|---|---|---|---|
| 6,950,427 | B1 | 9/2005 | Zinin |
| 2002/0046271 | A1 | 4/2002 | Huang |
| 2002/0054595 | A1 | 5/2002 | Ambe |
| 2002/0085585 | A1 | 7/2002 | Tzeng |
| 2003/0067925 | A1 | 4/2003 | Choe |
| 2003/0147412 | A1 | 8/2003 | Weyman et al. |
| 2003/0169748 | A1 | 9/2003 | Weyman et al. |

(Continued)

FOREIGN PATENT DOCUMENTS

GB        2384956 A        8/2003

(Continued)

OTHER PUBLICATIONS

Moy, J., "OSPF Version 2", Network Working Group, Request for Comments 2328, STD: 54, Obsoletes: 2178, Apr. 1998, pp. 1-244.

(Continued)

*Primary Examiner* — Kwang B Yao
*Assistant Examiner* — Juvena Loo

(57) ABSTRACT

A stack of network routers is composed of at least one (elected) master unit and one or more slave units each capable of running a routing protocol. Only the master unit runs the entire routing protocol at a given time. It forwards direct update messages via a transmission control protocol to each of the slave units. These direct update messages may include specific packet formats for the protocol state machinery where such machinery is required by the routing protocol, e.g., the interface state machine and the neighbor state machine for the OSPF protocol, and for the net databases, e.g. the link state databases for the OSPF protocol, in each of the slave units. Each slave unit may run its protocol state machinery (where provided) based purely on the direct update messages received from the master. The synchronisation of the net databases may be based on snooping net update packets and a comparison of the information received thereby with verification data messages sent from the master unit. The synchronization allows the running of the routing protocol on multiple physical routers in a stack without requiring the overhead of a back-up unit that would not perform routing unless a master router unit became unavailable.

9 Claims, 12 Drawing Sheets

U.S. PATENT DOCUMENTS

| | | | |
|---|---|---|---|
| 2004/0024908 A1* | 2/2004 | Valdevit et al. | 709/248 |
| 2004/0146056 A1* | 7/2004 | Martin | 370/401 |
| 2004/0246902 A1* | 12/2004 | Weinstein et al. | 370/238 |
| 2005/0111349 A1* | 5/2005 | Vasseur et al. | 370/216 |
| 2009/0116514 A1* | 5/2009 | Yan et al. | 370/509 |

FOREIGN PATENT DOCUMENTS

| | | |
|---|---|---|
| GB | 2386524 A | 9/2003 |

OTHER PUBLICATIONS

Malkin, G., "RIP Version 2", Network Working Group, Request for Comments: 2453, Obsoletes: 1723, 1388, STD: 56, Nov. 1998, pp. 1-20.

Hinden, R., "Virtual Router Redundancy Protocol (VRRP)", Network Working Group, Request for Comments: 3768, Obsoletes: 2338, Apr. 2004, pp. 1-27.

* cited by examiner

| NEIGHBOR ID | NEIGHBOR IP ADDRESS | NEIGHBOR OPTIONS | NEIGHBOR PRIORITY | NEIGHBOR STATE | DD SEQ# | NEIGHBOR'S DESIGNATED ROUTER | NEIGHBOR'S BACKUP DESIGNATED ROUTER |
|---|---|---|---|---|---|---|---|
FIG. 11
FIG. 12
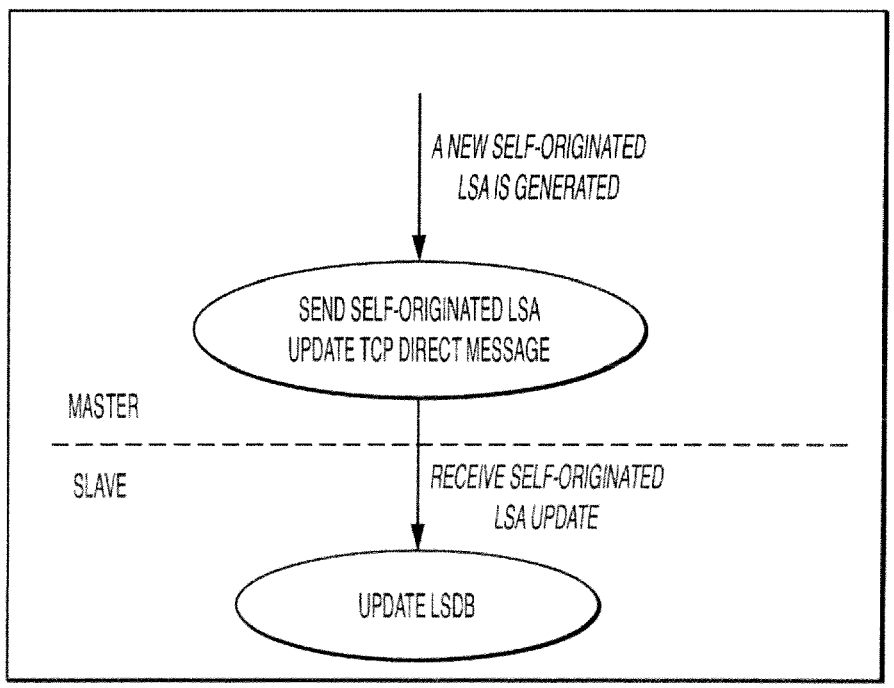
FIG. 13

STACKABLE ROUTERS EMPLOYING A ROUTING PROTOCOL

RELATED APPLICATIONS

This application is a continuation of U.S. patent application Ser. No. 10/744,974 filed Dec. 22, 2003 now U.S. Pat. No. 7,463,654, incorporated by reference herein.

FIELD OF THE INVENTION

This invention relates to packet-based communication systems which employ addressed data packets for the conveyance of information between units in the system and more particularly to the 'stacking' or 'cascading' of routing entities so that they appear to constitute a single logical routing entity. The invention specifically concerns the adaptation of a routing protocol, particularly the OSPF (open shortest path first) protocol in a stack or cascade of routers.

BACKGROUND TO THE INVENTION

Network units such as switches which include a multiplicity of ports for connection to other units or users are commonly made with a fixed number of ports in order to achieve efficiency of manufacture. It is known to 'stack' or 'cascade' such units by means of interconnection and a common control or management system to constitute a single switching or routing entity from a multiplicity of individual units. A particular example is disclosed in U.S. patent application Ser. No. 10/093,506 of Weyman et al, published as US2003-0147412-A1.

As is known, routers, as distinct from bridges, are required amongst other things to route packets between different networks or sub-nets. For this purpose they are required to perform a substantial processing on packets, such as a change in relevant MAC addresses in accordance with a selected route to a destination defined by a network address. Moreover, a router preferably is capable of performing a routing protocol, which normally comprises an advertising function, by means of which a router informs other routers by way of routing information packets of the routers and networks it can reach, and a listening function by responding to such packets to build up routing tables, which are used to generate forwarding data such as MAC addresses and port numbers indexed against the network addresses of packets.

The aforementioned application describes a cascaded stack of routing units each of which is capable of routing packets that it receives at its external ports. The routing units can conduct an election for a lead router that lends network and media access control addresses to the router interfaces of the other units in the stack. The stack is organised so that only the lead router performs a full routing protocol whereas the subordinate units have selected functions within the routing protocol suppressed but have a full routing capability.

An important aspect of stacked routers is the provision of resilience, that is to say the provision of a facility that enables the stack or at least a remainder of the stack to continue in appropriate operation notwithstanding the failure of a connection between units in a stack or the failure of one of the units in a stack. Resilience normally requires the provision of at least one closed path or multiplicity of closed paths in the stack or cascade of networks. A simple example is the connection of the 'top' unit of a stack to the 'bottom' unit of the stack so as to permit connectivity between the units of the stack notwithstanding the failure of any one of them.

Alternatively, connectivity may be maintained with the aid of neighboring switching units that are connected to more than one unit in the stack.

An aspect of resilience, particularly if it involves units not in the stack is the enabling of new elections where a set of functional units are separated from another unit or units in the stack. Bearing in mind that temporarily disrupted stacks may be reconnected, a further aspect of this is the avoidance of two elected masters in the same stack or remainder of a stack. Co-pending U.S. patent application Ser. No. 10/195,503 of Weyman et al. (published as 2003-0169748-A) describes stackable router units wherein a lead or master unit can transit to a master routing state and in that state broadcast its address as an advertisement to other units on the network. When a unit receives the advertisement it can transit to a master bridging state and its routing facility is disabled. The purpose of this facility is to enable a single unit in a segment of a stack to become a master unit and also to enable negotiation between the master units of respective segments to determine which of them will be the single lead or master unit for the reconnected stack and would therefore have control of the routing interfaces in the stack according to the abovementioned applications.

Further details of resilient stacked routers are also disclosed in the aforementioned patent applications, the disclosures of which are incorporated herein by reference.

It is mentioned above that one of the functions performed by a router is the executing of a routing protocol to determine a route to a network destination. One important protocol for this purpose is the OSPF protocol. The OSPF protocol is fully described in its present form in for example RFC-2328 OSPF Version 2 (Ascend Communications Inc, April 1998). It is presumed in the following that the reader has a knowledge of that protocol, which is incorporated by reference herein. Another routing protocol is known as RIP (Routing Information Protocol).

SUMMARY OF THE INVENTION

It is desirable in the implementation of a scheme for stacked resilient routers to allow for the stack (in whatever particular configuration it may be disposed) to be changed and/or augmented, by for example the addition of units to the stack or the removal of units from the stack.

It would be desirable to implement a routing protocol as one logical router running in effect on a multiplicity of physical routers in a stack. However, the routing protocols in general and the OSPF protocol in particular do not provide any means to achieve this.

It is known to provide redundancy for OSPF and other protocols using the virtual router redundancy protocol (VRRP). This protocol dynamically elects a virtual router (known as the master) that forwards packets to a back-up unit. If the master should fail or otherwise become unavailable, the back-up unit would take its place. However, the miming under this protocol does not achieve distribution of the routing load across the router. In particular the 'back-up' router is not used to route traffic unless the master become unavailable.

Routing protocols to which this invention relates comprise a database (herein called 'net database') which contains information on the paths or links in the network from the router. For the OSPF protocol, which is a 'link state' protocol, the database is known as the 'link state database' (LSDB). For a protocol such as RIP, which is a 'distance vector' protocol there is a corresponding database which defines a vector representation of paths from the router via the relevant nodes in the network.

Some but not all routing protocols also require for their operation protocol state machinery, i.e. a protocol state machine or protocol state machines. For the current OSPF protocol the 'protocol state machinery' is constituted by an interface state machine (ISM) and a neighbour state machine (NSM). RIP is one example of a routing protocol which does not require protocol state machinery.

It is therefore desirable to provide a means of synchronising a routing protocol such as OSPF within a stack, and in particular the net database, i.e. the link state database (LSDB) for OSPF, and, where required, the protocol state machinery, i.e. the interface state machine (ISM) and the neighbor state machine (NSM) for OSPF, on a multiplicity of units so as to enable the protocol to run on multiple physical routers in a stack without requiring the overhead of a back-up unit that would not perform routing unless a master router unit became unavailable.

The essential difficulty, however is that whereas synchronisation of operation between routers can be achieved according to a routing protocol such as OSPF when those routers are both fully operating the protocol, synchronisation according to the protocol is not available when a slave unit, in accordance with the requirements of a resilient stack, must not send messages such as link state messages that would necessarily require it to be a separate identifiable routing entity.

In a preferred form of the invention, in a stack of network routers which are interconnected and organised to constitute a single routing entity, said routers comprising a single master router and at least one slave router;
(a) each of the routers is capable of performing fully a routing protocol, each of the routers a respective net database;
(b) said master router only fully performs said protocol, only said master router generating and transmitting net advertisements in accordance with said protocol and receiving all types of update messages from its neighbors;
(c) each slave router snoops net update messages from the neighbors;
(d) the master router sends to each slave router verification data representing a current state of the master router's net database;
(e) each slave router makes a comparison of verification data with corresponding data in the slave router's respective net database so as to determine whether said slave router's respective net database is synchronised with the master router's net database; and
(f) each slave router requests a net advertisement from said master router if said comparison indicates that the respective net database of that slave router is not synchronized with said master router's net database.

Where, as in a link state protocol such as OSPF, each router in the stack has protocol state machinery for the operation of the protocol, the master router preferably sends to each slave router direct update messages which cause the respective protocol state machinery in each slave router to operate in synchronisation with the respective protocol state machinery of said master router.

Different aspects of the invention concern a stack of routers, a network unit which can operate in such a stack and a method of operating a stack of routers.

Preferably according to the invention a stack is composed of at least one master unit, preferably an elected master unit according to the aforementioned applications, and one or more slave units. A connection would exist between the master unit and each slave unit. The master unit is intended to run the entire routing protocol, forwarding direct update messages via transmission control protocol to each of the slave units. These direct update messages may include specific packet formats for the protocol state machinery, i.e. the interface state machine and the neighbor state machine for the OSPF protocol and the net databases, i.e. the link state databases for the OSPF protocol, in each of the slave units.

Each slave unit may run its protocol state machinery (where provided) based purely on the direct update messages received from the master. The synchronisation of the net databases may be based on snooping net update packets and a comparison of the information received thereby with verification data messages sent from the master unit. This verification data may comprise net advertisement headers. Preferably, to ensure reception of the verification data the verification data is sent from master to slave in packets in accordance with a sequence-controlled protocol such as TCP, which ensures the detection if a loss of a packet is detected and the recovery of such a packet. If the information received in the verification messages does not match the information on the slave unit, the slave may request a full copy of a net advertisement from the master. In this manner only a portion of the net database is sent to each of the slaves, thereby reducing the bandwidth required between the units.

By keeping a slave unit or the slave units synchronised during run time one of the slave units can take over the running of the entire routing protocol without interruption of operation if the master unit or a connection to it fails; thereby the stack will not be out of synchronisation with the rest of the network. The invention will also provide merge time synchronisation via TCP direct update messages, allowing the master to maintain its relationship with its neighbors while updating a new unit that has just joined the stack.

The invention will be more particularly described in the following, with reference to the accompanying drawings.

BRIEF DESCRIPTION OF THE DRAWINGS

FIG. 11 illustrates a neighbor's 'description'.
FIG. 12 illustrates a TCP direct update message with packaged multiple neighbor descriptions.
FIG. 13 is a flow diagram for synchronizing 'self-originated' link state advertisements.

DETAILED DESCRIPTION

Figure 1:
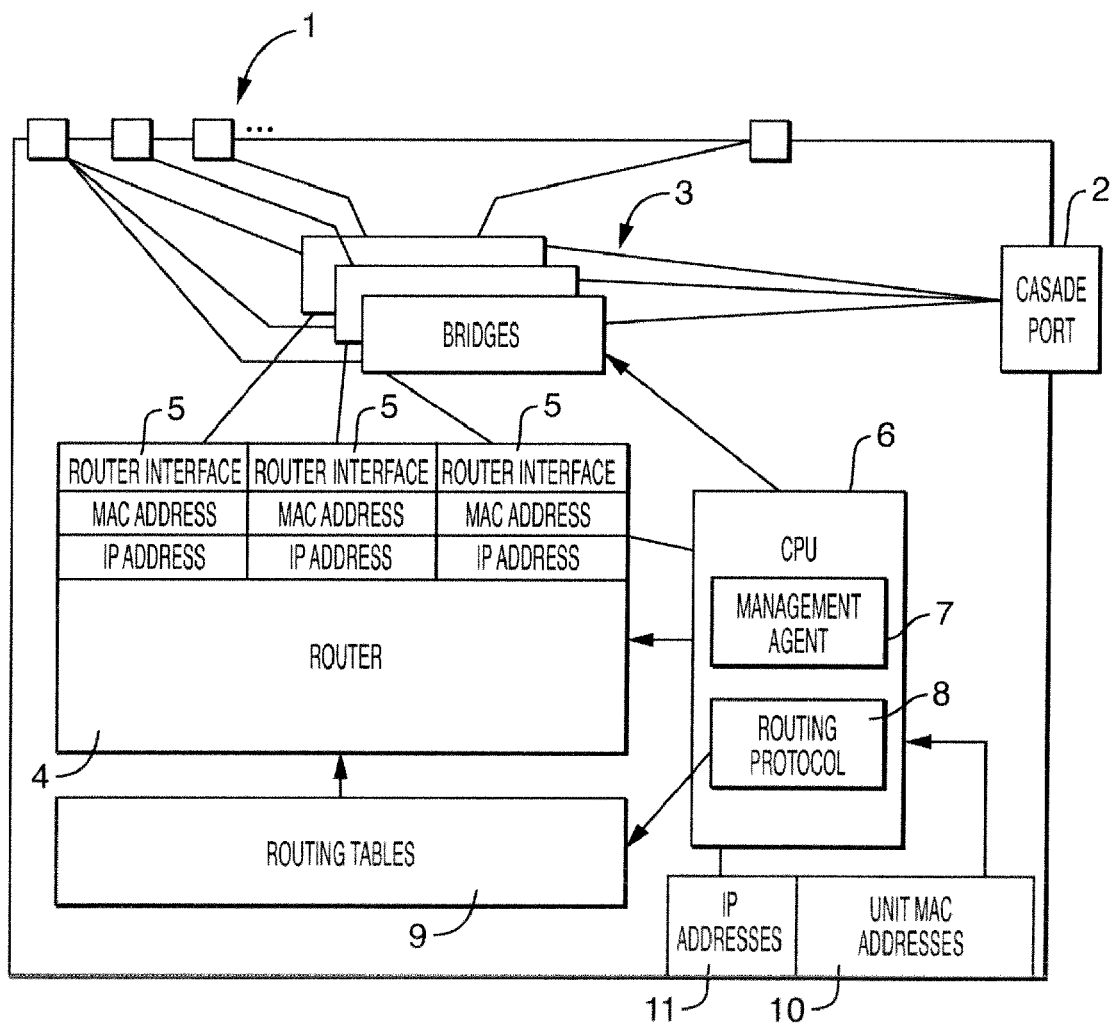
FIG. 1 is a schematic illustration of a router unit.

FIG. 1 illustrates, in conjunction with FIG. 3 to be described later, a network unit which is intended for use in a resilient stack according, for example, to the schemes shown in FIG. 2. A unit as described for example in FIGS. 1 and 3 is an example of a unit which is to employ a stackable routing protocol according to the invention.

The unit has a multiplicity of ordinary or 'front panel' ports 1 and at least one 'cascade port' 2. The 'cascade port' may be a separate dedicated connection between the units or it may be one of the front panel ports dedicated to perform 'cascade' functionality. The unit includes at least one and usually a multiplicity of 'hardware' bridges, or 'layer 2' switches 3.

Each port 1 is connected to at least one of the bridges 3 and the (or each) cascade port is connected to all the bridges, or to a 'logical' port connected to all the bridges. The unit includes a router 4 which has at least two, and in the illustrated example three, router interfaces 5. Each router interface 5 is connected to one bridge only, although each bridge may be connected to more than one router interface 5. For each interface there is some means such as a register storing a MAC address and a network (IP) address for the interface. For controlling the bridges and the router and for establishing the state machine to be described with reference to FIG. 1, there is a processor constituted by a CPU 6 which includes, in appropriate memory, a management agent 7 and a routing protocol 8. The routing protocol controls routing tables 9. Also embedded in the unit, in for example an interface for the management agent, are the unit's normal addresses, i.e. its MAC address(es) 10 and its network (IP) address(es) 11. These addresses are used for the management of the router, for example by an external network supervisor, and would, according to known practice, be supplied by the CPU to the router interfaces. As will become apparent later, the router interfaces can be enabled (in which case the unit can act as a router) or disabled (in which case the unit acts as a bridge).

The routing unit shown in FIG. 1 is in hardware terms in generally known form. The essential purpose of the bridges is to provide switching of packets on, for example, the same subnet or VLAN and to send packets to and from the router 4. Packets received at ports 1 or 2 and not requiring routing will be received by one or other of the bridges and forwarded according to the media access control (layer 2) switching executed by the relevant bridge. The router will normally need to modify the packet to provide it with a new source MAC address, decrementing a 'time to live' (TTL) value in the packet header by unity and usually recomputing a check sum. The router will have recourse to routing tables which are established by means of an appropriate routing information protocol so as to be able to compute a next hop for a routed packet.

This invention uses TCP/IP over Ethernet, but need not be limited to this specific application. It may also, for example, be implemented using SCTP/IP over Frame Relay or ATM.

Figure 2:
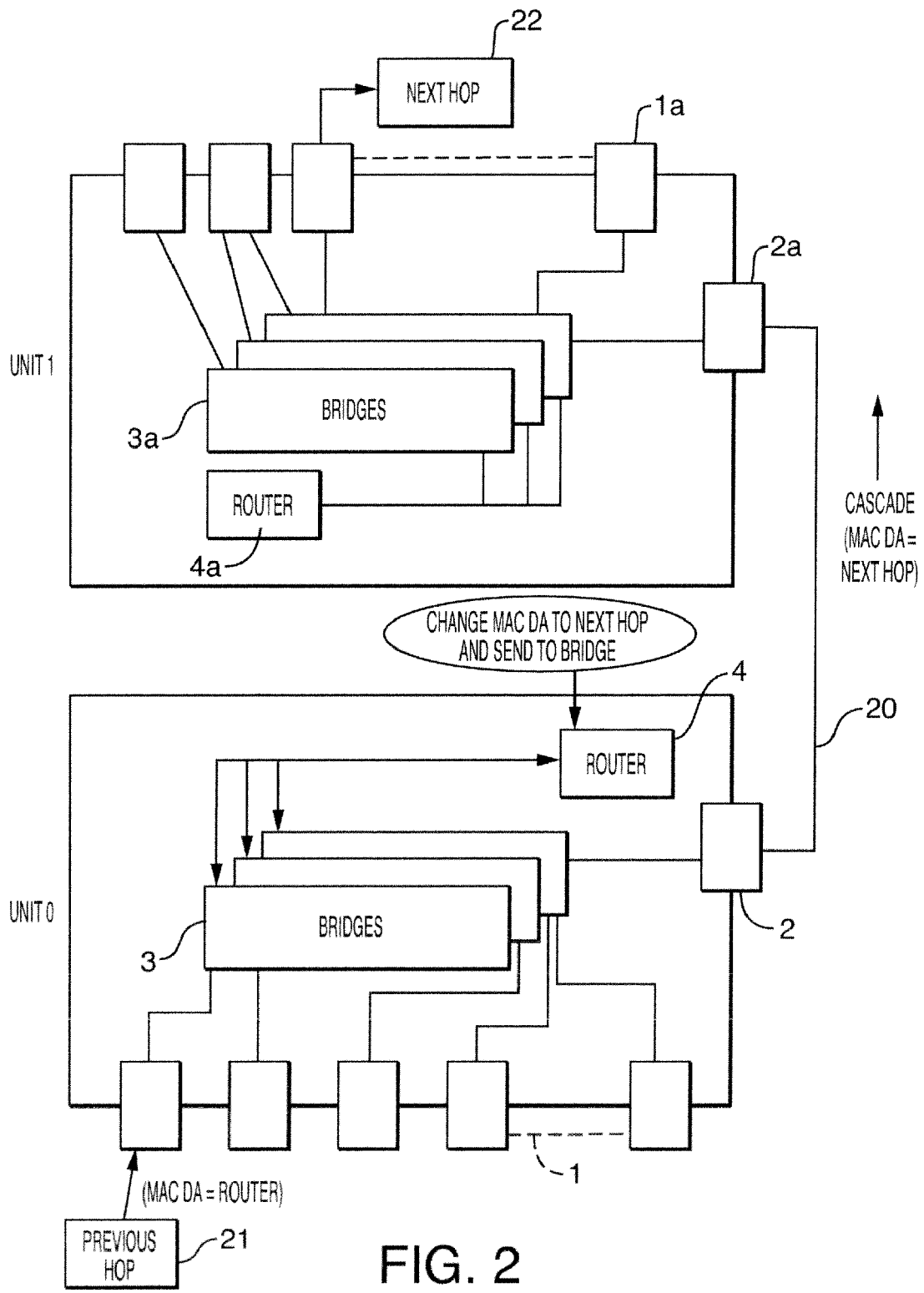
FIG. 2 illustrates a cascade connection of two router units.
Figure 3:
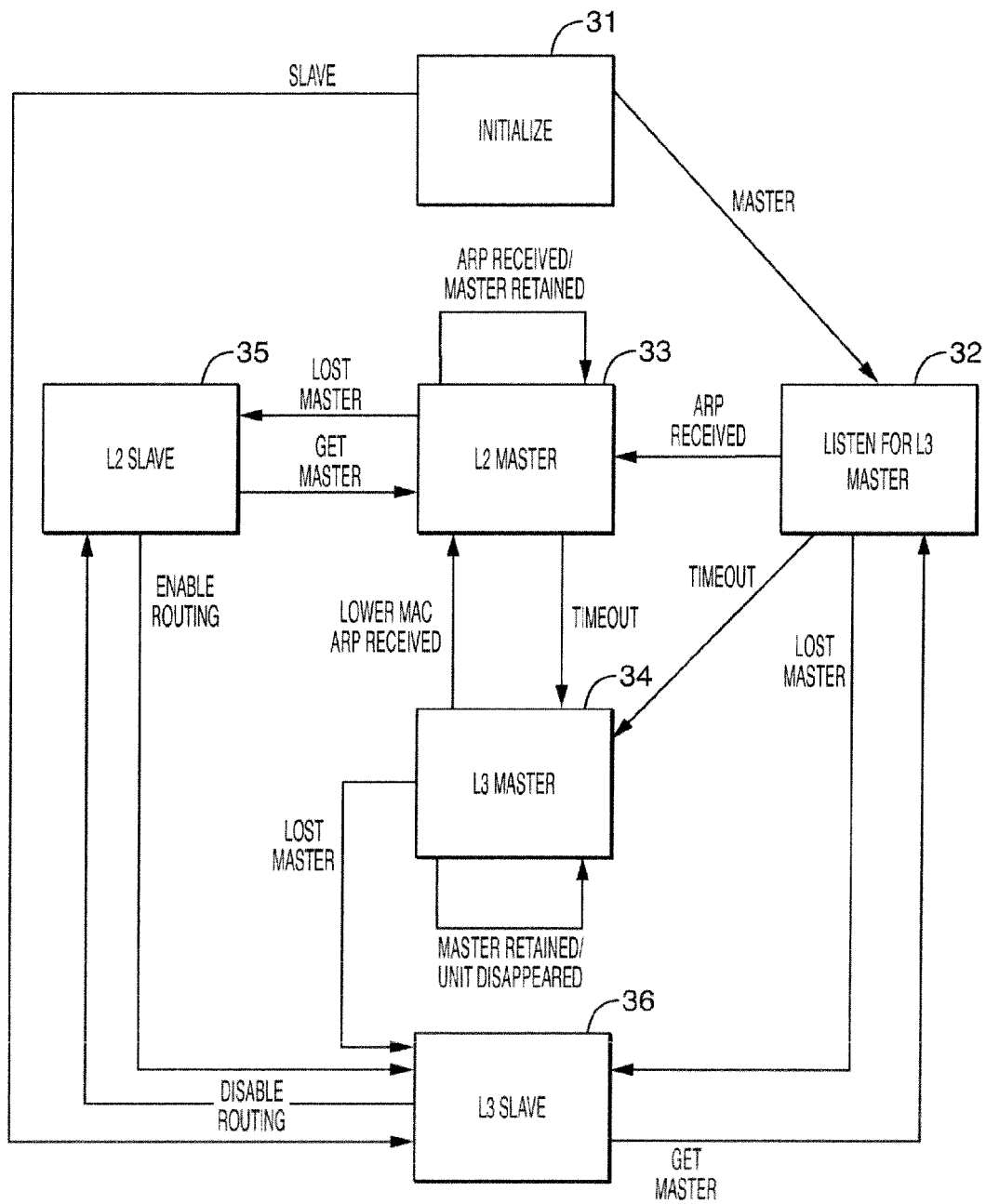
FIG. 3 illustrates a resiliency state machine.
Figure 4:
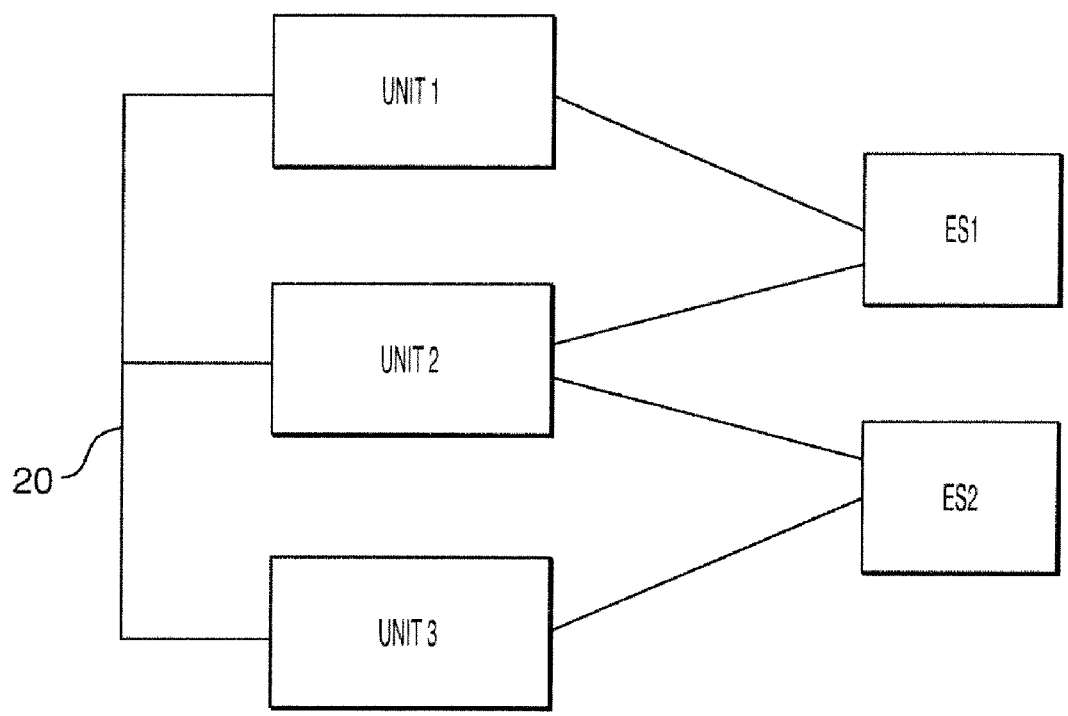
FIG. 4 illustrates a stack of units.

A unit according to FIG. 1 can be stacked as shown (for example) FIG. 2 or FIG. 4. There may be more units in a stack, such as four or eight, but the stacks shown in the Figures are shown with only two or three units for the sake of simplicity. Physical realizations of cascade connections are known per se in the art, for example in US patent applications for Donoghue et al, Ser. No. 10/067,738 and O'Neill et al, Ser. No. 10/337,299.

In the preferred examples of the invention all the units in a stack are intended to be capable of routing packets that they receive, and the unit owning the port on which a packet requiring routing is received is the one that routes it. If the egress port is on a different unit then, after routing, the packet will be forwarded by bridging to the unit owning that egress port. In this way, although there are multiple routers in the stack, only one will be involved in the routing of any given packet. There will be only one routing hop and so it will appear to entities outside the stack as if the stack contained a single router.

As is described in the aforementioned co-pending applications of Weyman et al, the units in the stack may conduct an election, which may be based on the exchange of control packets or frames to determine, in accordance with some predetermined criterion (such as which has the lowest MAC address) which of the units in the stack will be the lead or master and which will be the subordinates or slaves. The significance of this is that the lead or master (hereinafter called simply 'master' for convenience) will conduct the full routing protocols and address resolution protocols whereas the other units (called hereinafter simply 'slaves' for convenience) will have selected ancillary functions relating to these protocols suppressed, so that for example they do not broadcast RIP (Routing Information Protocol) or ARP (Address Resolution Protocol) packets. This is consistent with the concept of maintaining a single routing entity in the stack and saves considerably on the occupation of bandwidth (on the cascade and generally) by packets which would otherwise be broadcast according to these protocols.

Furthermore, as also described in the aforementioned co-pending applications of Weyman et al, the master router interfaces will employ the same set of IP addresses as for the corresponding interfaces in the other units and preferably the same MAC addresses, as will be explained later. This is achieved by causing one of the routers, particularly the master router, to lend its MAC addresses to the other (slave) units.

The goal of resiliency for (particularly) a stacked router is to allow the router interfaces to remain operational after the failure of a unit in the stack or after the failure of a cascade link between units. To provide this resiliency, appropriate functionality is required within the units; it is also desirable for the units to be able to communicate other than by way of the cascade. For this purpose edge devices connected to the router may be configured with redundant physical links to the router units. Depending on the configuration, different levels of resiliency can be provided for different devices. In general, the trade-off is ports versus resiliency, i.e. the more resilient the configuration, the fewer additional ports are achieved by stacking router units.

FIG. 2 illustrates the progression of a packet into and out of a stack of routers. In the example shown in FIG. 2 it is presumed that a packet is received from a previous hop (21) at Unit 0, and will be passed via the cascade to Unit 1, and egress from a front-panel port on Unit 1 to the next hop (22).

In FIG. 2, Unit 0 has front-panel ports 1, a cascade port 2, bridges 3 and router 4. Unit 1 has front-panel ports 1*a*, cascade port 2*a*, bridges 3*a* and router 4*a*.

In the system shown in FIG. 2, a packet from the previous hop 21 is received at one of the front-panel ports 1 and at the time its MAC destination address is set to the router (4). This packet is bridged by one of the bridges 3 to the router 4, which will change the MAC destination address to that required for the next hop (and change the source MAC address to that of the router 4), make any other modifications (such as re-computing a checksum) normally required by a routing stage and send the packet to the relevant bridge so that the packet is sent out on the cascade 20, in this example by way of port 2.

Of course, a substantial number of packets received at the first unit may require egress only from a front-panel port 1. The reception and forwarding of such packets is not directly relevant to the present invention. However, since such of those packets that require routing will be routed by router 4, in the receiving unit, such packets will not require sending on the cascade to another unit for routing.

When the packet is received by Unit 1, by way of cascade port 2*a*, the destination MAC address is already set for the next hop. It can therefore be subjected to an ordinary MAC address look-up by a bridge 3*a* to obtain the port number for the next hop. Intervention of the router 4*a* in Unit 1 is not required.

Lending of Addresses

In order to facilitate the operation of the stack, the router interfaces in each unit will employ the same set of IP addresses as for the corresponding interfaces in the other units, and preferably the same MAC address, as will be explained later. This is achieved by causing one of the routers, herein called 'master' router, to lend its router interface's IP addresses and MAC addresses to the other routers, herein called 'slave routers'. These terms are used to indicate not only the lending and borrowing of addresses but some minor operational differences, other than in the primary task of routing packets, which is shared by all the routers; these differences are explained later.

As is discussed above, the units in a stack or segment can conduct (preferably periodically) an election to determine which is the master and which the slave or slaves in the stack or segment. A unit which is (currently) a master holds the master license; a unit which does not hold the license is a slave. Loss of the license is denoted hereinafter as an indication (from the CPU or other means which governs the election) of 'LostMaster'; gaining of the license is denoted as an indication of 'GetMaster'. If an existing master retains the license after a new election a 'MasterRetained' indication is produced.

Resiliency State Machine

The state machine in FIG. 3 is one example of the means by which resiliency is put into practice. It is more fully described in Weyman et al, supra, but is partly repeated here for convenience. The machine preferably has six principal states 31 to 36 which are described below, as are the preconditions for the transitions between states. The state machine is preferably established in software but a hardware version would be feasible.

At initialization the resiliency state machine is set up by the CPU 6. This will create the resiliency state machine task and enter the initial state. The initial state waits for an event indicating whether the unit is a master or a slave. Once one of these events occurs, the processing begins to determine if the unit will operate in Layer 2 mode or Layer 3 mode.

Resiliency State Machine Description

A description of the state machine follows, in terms of the various states. The various 'events' are defined in a subsequent section. The state machine includes a timer of which the various timing intervals are defined in a subsequent section.

State Descriptions (a) Initialize (31)

The purpose of this state is to wait for the completion of interface configuration. This occurs at start-up or when a slave unit needs to reconfigure its interfaces to agree with the master. The state machine will leave (exit from) this state when the unit has determined, in accordance with the election previously described, whether it is the 'master' or a 'slave' in the stack. If the unit is a master, the state machine sets a timer to a value called herein 'ARP LISTEN TIME' (defining a presumed maximum time for which it is necessary or appropriate to listen for ARP packets identifying an L3 master which would produce conflict) and transitions to the 'ListenforL3Master' state 32. If the unit is a slave the state machine transitions to the 'L3Slave' state 33.

(b) ListenForL3Master (32)

This state is entered if the unit has been elected a master. The purpose of this state is to make sure no other 'L3 Master' (master of a segment enabled to route) is running before the stack or segment is allowed to run in a routing mode.

If an appropriate ARP request is received, there is already a master of a (different) routing segment and so routing needs to be disabled for units on the local segment. The state machine will send a 'DisableRouting' command to all other units in the local segment; set the timer to a value called herein 'ARP RECEIVE TIME'; and transitions to the 'L2 Master' state 33.

If the timer (set in state 31) has timed out (so that no ARP packets identifying a conflicting master have been received, the timer is set to a value called herein 'L3 VIE TIME' and the stack machine transitions to the 'L3 Master' state 34.

If while the machine is in the 'ListenforL3Master' state 32, a 'LostMaster' indication is received, the state machine transitions to the 'L2 Slave' state 36 (see below).

(c) L2 Master (33)

This is the state wherein the unit is a master but the unit and other units in the segment may bridge but not route.

If a Master ARP is received, then the timer is set to the value 'ARP RECEIVE TIME' and the machine reverts to the same (L2 Master) state.

If ARP timeout occurs (indicating loss of connection with an existing L3 master), then the timer is set to the value 'L3 VIE TIME' and the state machine transitions to the 'L3 Master' state 34.

If in state 33 an indication of 'LostMaster' is received, the state machine transitions to the 'L2Slave' state 35.

If in state 33 a 'MasterRetained' indication is produced, then a 'DisableRouting' command is sent to all other units in the stack and the state machine reverts to the same 'L2 Master' state.

(d) L3 Master (34)

While in this state the unit will periodically transmit ARP Requests identifying one of its router interfaces. Although not directly relevant to the invention, a unit may have 'default' and non-default interfaces and in practice the identified network address may be that of the lowest numbered non-default interface. If a Lower MAC Master ARP is received, then the machine will (among other actions) send 'DisableRouting' commands to all other units in the segment and transition to the 'L2 Master' state 33.

If the Master License is lost the state machine will transition to the 'L3 Slave' state 36.

If a 'MasterRetained' indication is received the unit will send an 'EnableRouting' command to all other units in the segment and remain in the L3Master state. The same will occur if the unit receives an indication that a unit has 'disappeared' (see below).

(e) L2 Slave (35)

If a 'Master License' indication (GetMaster) is obtained, then the timer is set to the value 'ARP RECEIVE TIME' and the state machine transitions to the 'L2 Master' state 33.

If an 'Enable Routing' command is received, then the routing interfaces are enable and the machine transitions to the L3Slave state 36. This occurs when a segment of which the units may only bridge are allowed to route.

(f) L3 Slave (36)

If Master License is obtained, then the timer is set to the value 'ARP LISTEN TIME' and the state machine transitions to the 'Listen for L3 Master' state 32.

If a 'Disable Routing' command is received, then the routing interfaces are disabled and the state machine transitions to the 'L2 Slave' state 35.

It may be noted that FIG. 3 is not the only way in which the state machine may be organised. For example, the effect of losing the master license in states 32 or 34 may be different: both could cause transition to the L2Slave state 35. Moreover, the possible transitions from the Initialise state 31 may be either to the 'Listen for L3Master' state 32 or to the L2Slave state 35 instead of the L3Slave state 36.

Introduction to Protocol Stacking

As is mentioned hitherto, the object of the present invention is to achieve a smooth transition for a stack of units when the stack changes either by the addition of units to the stack or the removal or effective removal of a unit or connection from the stack. There are two 'scenarios' which are relevant in this connection. They are termed herein the "stack-split' scenario' and the "stack-merge' scenario'. These are explained with reference to FIG. 4.

FIG. 4 illustrates a stack of three units, denoted Unit 1, Unit 2 and Unit 3, which are connected by a cascade connection 20 (as described with reference to FIG. 2). The stacked units also have external connectivity via two 'edge' switches, ES1 and ES2. FIG. 4 corresponds to a Figure in the aforementioned patent applications and, as will be apparent from those earlier applications, the resiliency state machine described with reference to FIG. 3 is specifically intended to cope with the difficulty of a cascade failure so that the units can continue to operate as a stack only by virtue of connectivity via the edge switches.

It will be presumed initially that Unit 1 is the 'master' and Unit 2 and Unit 3 are the slaves. If Unit 1 fails, then the resiliency protocol described with reference to FIG. 3 and in the earlier applications will elect a new master between Unit 2 and Unit 3. For the sake of example, it will be supposed that Unit 2 is selected as the master because it has a lower number in the stack after Unit 1 fails. Unit 2 cannot detect Unit 1, but the stack comprising Unit 2 and Unit 3 continues routing. For protocol stacking this failure case is a 'stack-split' scenario. Whereas previously Unit 1 had the functionality of the protocol master, this task must be assumed now by Unit 2.

A second failure case is if one of the slave units fails. Let us suppose this is Unit 2. Unit 1 will remain the master and the stack comprising Unit 1 and Unit 3 will continue routing. For protocol stacking this failure case falls into the 'stack-split' scenario. Unit 1 continues with the functionality of the protocol master.

A third case is that the cascade connection between Unit 1 and Unit 2 fails. A new master is elected between Unit 2 and Unit 3. Unit 2 is selected because it is the lowest numbered unit in the stack. Unit 2 detects that Unit 1 is still operational and begins operating in 'layer 2 mode'. When the unit goes into that mode, then as previously described, the IP interfaces are shut down, causing also the routing protocol interfaces to be shut down. As a result, routing will cease on the unit. Unit 2 will direct Unit 3 to operate in layer 2 mode. For routing protocol stacking this failure case falls into the 'stack-split' scenarios. Unit 1 will continue with the functionality of the routing protocol master.

If the cascade connection between Unit 2 and Unit 3 fails, then Unit 1 and Unit 2 will continue operating unchanged. Unit 3 will become a master of its single unit stack. Unit 3 will detect that the previous master, Unit 1, is still operational and will enter operation in layer 2 mode. Routing protocol stacking falls into the 'stack-split' scenario. Unit 1 will continue with the functionality of the routing protocol master.

If a new slave, Unit 4 (not shown), joins the stack then Unit 1 will remain the master. For routing protocol stacking this case falls into a 'stack-merge' scenario and Unit 4 needs to be synchronised with the master unit.

Now let us suppose that Unit 1 fails then re-joins the stack. When Unit 1 fails, Unit 2 becomes the master. If Unit 1 then recovers it will again take over as the master. Switching the master status back to Unit 1 requires that all the IP interfaces be taken 'down'. This in turn will take down all the routing protocol interfaces, requiring the routing protocol to be restarted.

If either Unit 2 or Unit 3 fails and then re-joins the stack, then as far as routing protocol stacking is concerned it is the same as a slave unit joining the stack.

If the cascade between Unit 1 and Unit 2 fails then Unit 1 fails, then Unit 1 initially will continue operating as master and Units 2 and 3 will go to layer 2 mode. If Unit 1 subsequently fails then Unit 2 will detect the failure and take over as the master. For routing protocol stacking this is a 'stack-split' scenario and Unit 2 needs to take on all the functionality of the routing protocol master.

If Unit 1 fails then returns separately from the stack, then as described above there will be a new elected master, Unit 2. If Unit 1 returns but is no longer part of the stack, then Unit 1 will detect Unit 2 and Unit 1 will remain in layer 2 mode.

Let us suppose the cascade between Unit 1 and Unit 2 fails and then recovers. Unit 1 would continue operating as the master and Units 2 and 3 would go to layer 2 mode. If the cascade then recovers it would be the same as two new slave units joining the stack. This case is a 'stack-merge' scenario.

Finally, on power-up of the entire stack at the same time, layer 3 stacking will elect Unit 1 as the master. This is a 'stack-merge' scenario.

Design Overview

The present embodiment relies on the snooping ability of hardware in addition to 'private' unit-to-unit communication to synchronise a stack of units. It will be described with reference to the OSPF protocol. However, the snooping and updating mechanism may, as previously indicated be applied to other routing protocols, although the extent of the snooping can be different, depending on the particular mechanics of the respective routing protocol.

Unit-to-unit routing protocol stacking communication take places via TCP connections. The master sends its direct update messages via TCP for reliable delivery and to prevent packet loss. There is a point-to-point TCP connection from the master to each of the slaves. The TCP connections are managed by a TCP messaging engine. This exists within the OSPF software, as is described with reference to FIG. 5. OSPF stacking functionality can be shielded from TCP communication specifics by the use of a message interface to the TCP messaging engine, as will be described later on.

Synchronisation of the OSPF interface state machine (ISM), neighbor state machine (NSM) and link state database (LSDB) are preferably handled independently from one another and controlled by code within the OSPF component.

OSPF stacking code will incorporate modular interfaces to the IP component. These modular interfaces comprise function registration calls and one way function calls.

Function registration will be used to pass information from the IP component to the OSPF component. One way function calls are used to relay information from the OSPF component to the IP component. The TCP interface and the layer 3 stacking interface are described further in a later section.

Figure 5:
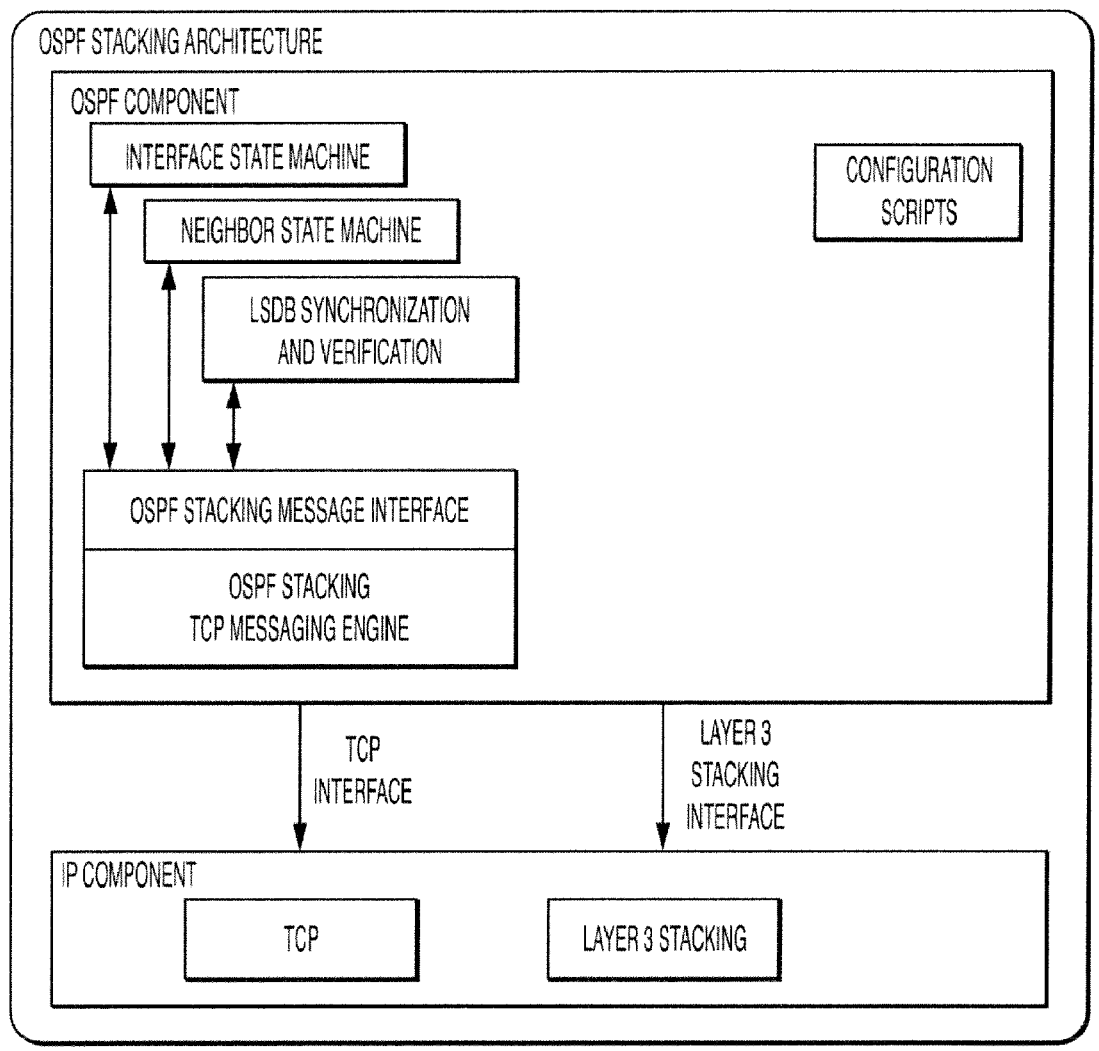
FIG. 5 illustrates a stacking architecture.

FIG. 5 illustrates the OSPF stacking architecture of the software for controlling the OSPF protocol. The software comprises an OSPF component which includes, as described by the protocol, an interface state machine, a neighbor state machine and a link state database synchronisation and verification block. These sub-components interact with an OSPF stacking message interface coupled to an OSPF stacking TCP messaging engine. The OSPF component contains the code required to enable OSPF stacking and has two modular interfaces for relaying information to the IP component of the software. One interface, called the layer 3 stacking interface, is required to communicate with the layer 3 stacking functionality contained within the IP component. This interface employs direct function calls from the OSPF component to the layer 3 stacking in order to set or retrieve information from layer 3 stacking. Function registration is used in order to pass information from the layer 3 stacking to the OSPF component.

The information which is shared between the layer 3 stacking and the OSPF comprises layer 3 master events, layer 3 slave events and slave ready events. A layer 3 master event indicates that this unit should operate in master mode. This occurs for example on transition between states 32 and 34 in FIG. 3 or on transition between states 33 and 34. When the event occurs, the unit is in L3 master state and will be sending and receiving OSPF protocol messages. Also, as required by the present invention, the unit should be ready to initiate run time synchronisation procedures such as link state database (LSDB), transfer of LISA verification if a slave unit is present in the stack.

A layer 3 slave event indicates that the unit should be operating in slave mode. Such events cause transition between, for example, the L2 master state 33 in FIG. 3 and the L2 slave state 35 or to occasion transition between the L3 slave state 36 and the L2 slave state, for which routing is disabled. More specifically in relation to the present invention, the slave unit(s) will suppress the sending of OSPF protocol messages and is required to limit the reception of OSPF protocol messages.

A slave ready event indicates that a slave unit has completed 'static' synchronisation and is ready for any runtime synchronisation procedures that may need to take place. One example of 'static' synchronization is LSDB transfer.

The events described in the foregoing paragraphs currently exist within 'layer 3 stacking', namely the software that in effect determines the state machine described in FIG. 3 and in the aforementioned patent application.

The TCP interface is required to communicate with TCP functionality that is contained within the IP component. This interface employs direct function calls from the OSPF stacking component to the TCP component in order to set or retrieve information in the TCP component. Function registration is used in order to pass information from the TCP component to the OSPF stacking component. The well known TCP socket interface can be used to relay information to the TCP protocol engine that exists within the IP component.

Packet Reception and Transmission

Every unit of a stack will receive an OSPF packet that is received by any single unit of a stack. This provision of stack-wide packet reception is called herein 'snooping'. Snooping is part of the existing stacking architecture and will not require any functional change.

Although all units of the stack will receive an OSPF packet that is received by any one unit, the decision to process the packet which is received differs according to the unit's status, i.e. whether it be a master or a slave. Master units receive and process all types of OSPF packet. This is similar to the operation of a stand-alone unit. However, slave units will receive and process link state update and link state acknowledgement packets. This allows slave units to adjust to network changes in synchronisation with the master unit. Slave units may receive but are not required to process 'hello', 'database description' and 'link state request' packets. The master unit controls the slave unit's interface state machine and neighbor state machine. This eliminates the need for 'hello' and 'database description' packets. Furthermore, it is preferable that the slave unit be unable to transmit any link state update packets in response to link state request packets.

Snooping also allows stack-wide packet reception of any OSPF packet that is transmitted by any single unit of a stack. When a unit receives a packet that has been transmitted by another unit in a stack, that unit is said to receive a 'self-originated' packet. Neither a master unit nor a slave unit should process any self-originated packets. The protocol is organised to check for and discard self-originated packets.

Master units will generate and transmit all OSPF packet types. This again is similar to the operation of a stand-alone unit. Slave units neither generate nor transmit any OSPF packet types. This eliminates redundant messages emanating from the stack.

Static Data Synchronisation

Static data synchronisation, otherwise termed 'configuration synchronisation' requires that configuration data must be synchronised at a merge time and also at run time.

Merge Time Synchronisation

The configuration of a slave unit must be the same as the master unit. For the OSPF protocol, master-slave synchronisation requires certain information to be shared between master and slave. This information comprises the OSPF mode, the OSPF router ID, OSPF areas, OSPF ranges, OSPF interfaces, OSPF interface details, the OSPF ASBR mode and OSPF trap control.

The synchroniisation method preferably used for configuration data is a 'pull' method. Slave units synchronise individually by pulling information from the master unit by way of scripts and utility routines. This pulling process is executed by a slave unit whenever a new master unit is chosen. The layer 3 stacking synchronisation process should be modified to enable OSPF master/slave synchronisation. All configuration information synchronised on the slave unit will also be stored in PDS.

Runtime Synchronisation

It is also necessary to synchronise the units during runtime of the OSPF protocol.

Dynamic Data Synchronisation

In order to ensure that a stack of OSPF units acts a single virtual router, the state machines and link state database must be synchronised on all the units. The state machines are the interface state machine and the neighbor state machine. These three elements of the OSPF protocol are well known and described in the aforementioned RFC.

In one aspect of the invention TCP connections between the master unit and the slave units provide a means for ensuring synchronisation.

Master-Slave TCP Messaging Information

The TCP protocol is used to pass information between the master unit and the slave units within the stack. The TCP protocol is suitable because it contains characteristics such as acknowledgement and flow control. Also, TCP packets are lower in priority than that of system-critical packets such as stacking packets and network protocol packets. Their use (and possible large bandwidth presence at time of merge when the LSDB is transferred to slave units) will not adversely affect system-critical packet types by overflowing their queue space.

The TCP messaging engine is used to create and destroy TCP sessions between the master unit and slave unit(s). Code to support the TCP messaging engine resides in the OSPF component. The TCP messaging engine will send and receive messages for the following purposes: synchronization of the interface state machine; synchronization of the neighbor state machine; synchronization of the LSDB at merge time; and snooping packet receipt verification and recovery.

The master-slave TCP sessions will stay active throughout the life of the master-slave relationship. When a slave joins the stack, a TCP session will be created for that slave. When a slave leaves the stack, the corresponding session will be terminated. Should a new master be elected, all sessions will be terminated and then reestablished by the new master unit. The TCP Messaging engine will receive events about units joining or leaving the stack so that the corresponding TCP session may be opened or closed in response.

A standard OSPF header will be used for all communication in the TCP sessions. The OSPF header will be used to differentiate between ISM, NSM and LSDB messages.

Figure 6:
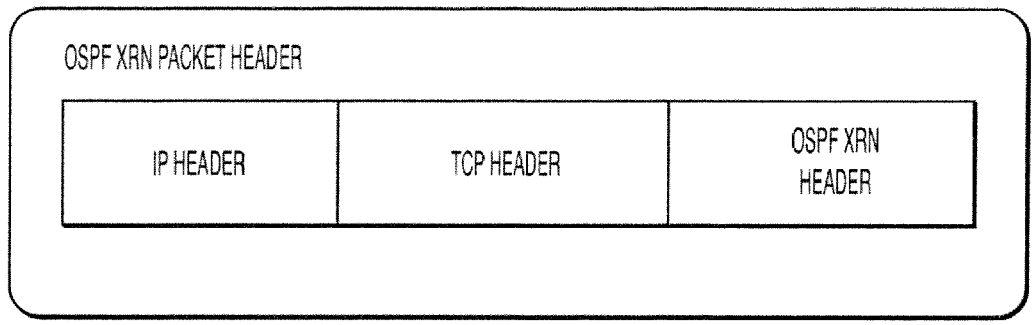
FIG. 6 illustrates an OSPF packet header.

The header is shown in FIG. 6 and comprises three segments, an 'IP header', which would be the customary header for a packet, a TCP header conforming to the TCP and an OSPF header.

OSPF stacking code will communicate to the TCP messaging engine through well-defined interfaces. The interface will buffer OSPF stacking code from concerns such as the number of stacking units in existence, the status of TCP sessions, message format, etc. The TCP messaging engine will also provide queuing mechanisms to handle temporary information storage/overflow.

Figure 7:
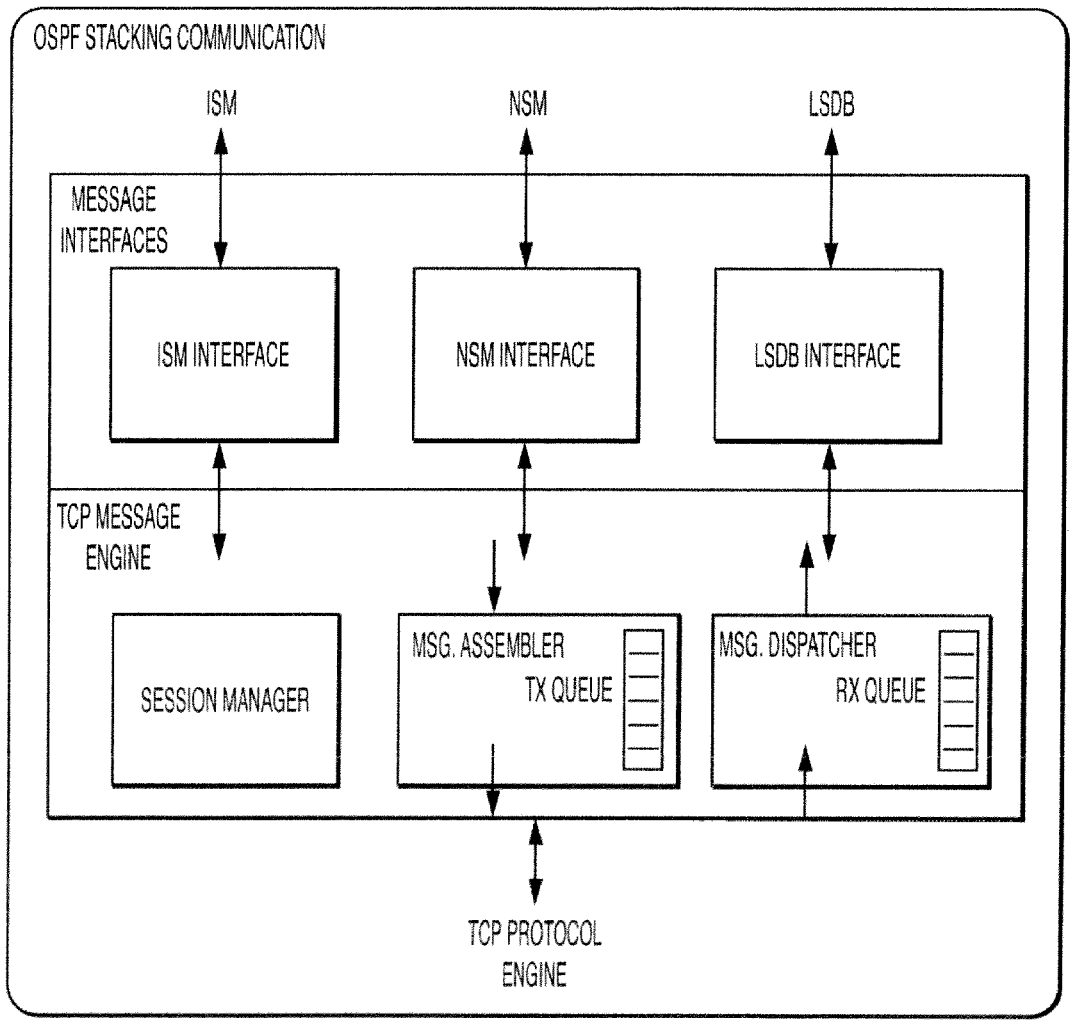
FIG. 7 illustrates OSPF stacking communication.

The stacking communication between the state machines and the link state database, the TCP messaging engine and the TCP protocol engine is shown in FIG. 7.

Interface State Machine Synchronization

The interface state machine (ISM) defines an OSPF interface operational status (i.e. Down, DR/BDR/DR Other, etc.) ISM operation is controlled by the basic states of an interface (i.e. Up, Down, Waiting, etc.) as well as the Hello Protocol.

There will be a direct relationship in the interface state assumed by the master unit and the interface state programmed to the slave unit(s). Each time an ISM state changes on the master unit, a message will be sent to the slave unit(s) to relay the state change.

Figure 8:
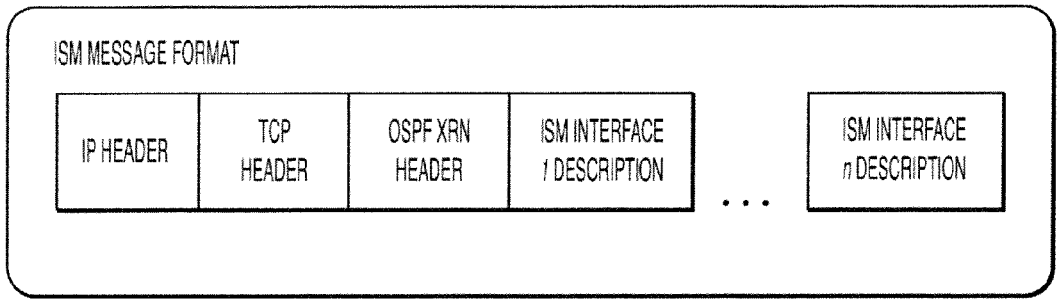
FIG. 8 illustrates an ISM message format.
Figure 9:
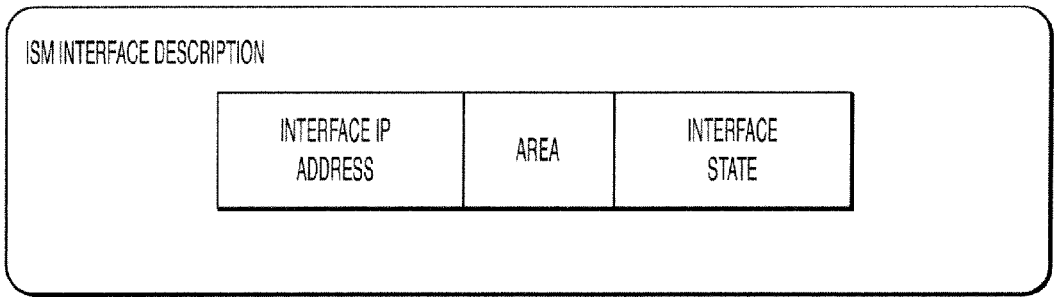
FIG. 9 illustrates an ISM interface description.

ISM operation on the slave unit(s) will be suspended from normal operation and be controlled/programmed by the master unit. Messaging between units will take place via a TCP session. ISM messages will have a format as shown in FIG. 8. They comprise an IP header, a TCP header, an OSPF header, and 'n' ISM interface descriptions. Each interface description has a format shown in FIG. 9 and comprises an interface (IP) address, an 'area' description and an interface state description.

The following ISM master states will be sent to the slave via TCP within the interface state description field of the ISM Message: Down, Waiting, Point-to-Point, DR Other, Backup and DR.

Figure 10:
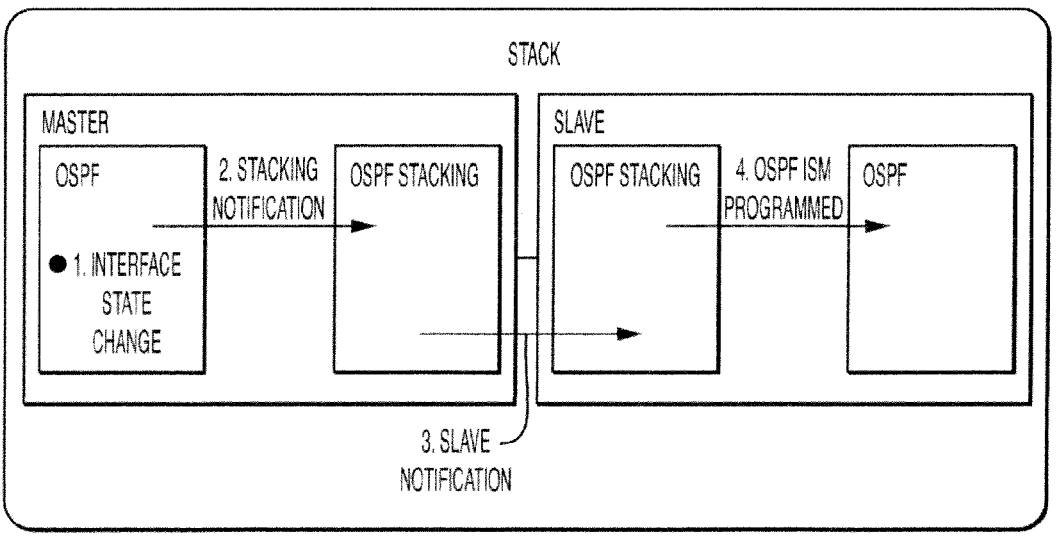
FIG. 10 illustrates an ISM control procedure.

The sequence of events in the ISM control procedure of a stack when an interface state change takes place on the master unit is shown in FIG. 10 and comprises the following:
1. The master unit undergoes an interface state change
2. The master unit ISM stacking code receives notification of the interface state change
3. The master unit ISM stacking code sends an ISM Message to the slave unit(s) containing the new interface state
4. The slave unit ISM stacking code sets the new interface state in its interface state machine within the OSPF code Neighbor State Machine Synchronization The neighbor state machine (NSM) can be functionally described as two components. The first component is the 'Hello Protocol'. The Hello Protocol is responsible for neighbor acquisition and maintenance and for ensuring two-way communication between neighbors. The second component is responsible for forming adjacencies to allow LSDB synchronization and reliable flooding.

The NSM is required to be synchronized throughout the stack so that:
(a) the slave units can participate in the flooding of the LSAs by snooping on the same LSU packets as master unit does. This will keep dissemination of new LSAs more efficient by eliminating latency which might have been incurred if snooping was not utilized;
(b) fail-over scenarios do not require the slave to reform adjacencies eliminating the disruption of the ongoing user sessions; and
(c) the SNMP/CLI/WEB interface from master and slave units will report coherent data.

This chapter outlines the mechanism for NSM synchronization in the stack of units.

In general, the NSM synchronization depends on direct updates sent from the master unit to the slaves. Such "client-server" architecture simplifies the operation of NSM in a stack-distributed router configuration, at the slight cost of added latency. The master's direct updates will be sent with TCP for delivery reliability. This eliminates the need for NSM to compensate for any packet loses. Using the TCP connection the master will send its TCP direct update messages to all of the slaves. Each slave will act appropriately to each received message by updating its NSM.

Hello Protocol

Only the master unit will run the Hello Protocol. The rest of the units, that is the slaves, will not directly participate in the protocol. This means that the master unit will be responsible for processing any Hello packets received by the stack. This also implies that the slaves do not snoop for Hello packets and that every Hello packet received by a slave must be forwarded onto the cascade port, so the master can process it. In addition, only the master unit will generate Hello packets for all of the router's interfaces.

Neighbor Acquisition

A new neighbor is discovered in the process of receiving its first Hello packet by the master unit. This will result in creating the neighbor's data structure. The initial state of a newly created neighbor is set to Init (as defined in the OSPF protocol). Next, the master sends its "INIT" TCP direct update message to all the slave units in the stack. On reception of the message each slave creates a new neighbor's structure in its database and sets its state to Init.

In the event that the master loses this Hello packet, the neighbor's structure will not be created but the subsequent neighbor's Hello message should quickly compensate for this deficiency. The slave's packet loss is irrelevant since it is depending on TCP direct updates from the master unit.

Neighbor Maintenance

As with the acquisition, only the master unit will do maintenance of the existing neighbors. The slave units will depend on the TCP direct updates from the master.

The maintenance is based on periodic Hello packet processing. This includes both reception and transmission of them.

The reception of the Hello packet restarts an inactivity timer. This is a single shot timer whose firing indicates that no Hello packet have been seen from the neighbor recently. An inactivity timer will be run on the master unit only, while being disabled on all the slaves. Whenever there is an inactivitytimer event processed by the master unit a corresponding "DOWN" TCP direct update message will be sent to all the slave units.

The same "DOWN" TCP direct update message will be sent whenever KillNbr or LLDown events occur on the master. The KillNbr event is an indication that all communication with the neighbor is now impossible. The LLDown event is an indication from the lower level protocols that the neighbor is now unreachable.

In the scenario when the Hello packet has been received which indicates unidirectional communication with the neighbor the 1-Way event is generated by master's NSM. This will also cause the master to send "INIT" TCP direct update message to the slaves.

Adjacency Forming

Not every pair of OSPF routers will establish an adjacency. The OSPF protocol defines what conditions must be satisfied for it to be created.

As a result of the adjacency forming process, a neighbor can resolve in one of two states: 2-Way or Full.

The 2-Way state is when the router could not establish an adjacency but there is a bi-directional communication with the neighbor. In this case the "2WAY" TCP direct update message will be sent to all the slaves. This could be triggered by the 2-WayReceived event or as the result of the AdjOk event. The first one happens when the bi-directional communication has been realized. The second is triggered by a decision making process which determines whether or not an adjacency should be established with the neighbor.

The Full state is the result of a completed adjacency forming process. In this state routers are fully synchronized, that is their link state databases are identical. To get to this condition both routers have to go through a sequence of states. This is part of the ordinary OSPF protocol as described earlier and will not be described herein.

To conserve cascade traffic only two of the intermediate states/events of the adjacency forming process will be signaled to the slaves. These are Exchange and Full.

The Exchange state is when the routers are describing their databases. In this state routers are fully capable of transmitting and receiving all types of OSPF routing protocol packets. It allows the descriptions packets to be interleaved with LS Update packets.

The NSM transitions to the Exchange state based on the NegotiationDone event. This event signals the start of the sending/receiving database description packets. The master will signal it to the slaves with "EXCH" TCP direct update message. Transition to the Full state is triggered by the ExchangeDone (when neighbor request list was emptied) or LoadingDone events. The corresponding TCP direct update message is "FULL".

The slaves do not participate in the exchange of the database description packets but they will snoop on the link state update packets, some of which may be the result of the LS requests sent by the master unit. This assumes the following:

1. Only the master builds a link state request list based on received database description packets
2. The slaves do not send LS request packets
3. The slaves do not process any received LS request packets There are several cases when processing database description packets can go wrong. For all those cases the SeqNumberMismatch event is generated which reverses the neighbor's state to the ExStart. Whenever this event occurs the "INIT" TCP direct update message will be sent to all the slaves.

Table 1 maps NSM events to their related TCP direct update messages. Any NSM event that is not represented in the table will not be signaled to the slaves. The design goal was to identify the states in which a neighbor can persist for a longer time, as well as minimizing the number of neighbor's state transitions to eliminate any added latency.

TABLE 1

| Master's NSM Event | TCP Direct Neighbor State Update Message |
|---|---|
| HelloReceived (Discovery of a new neighbor) | INIT |
| InactivityTimer | DOWN |
| KillNbr | DOWN |
| LLDown | DOWN |
| SeqNumberMismatch | INIT |
| 1-Way | INIT |
| 2-WayReceived | 2WAY |
| AdjOk (When adjacency can't be created or is being torn down) | 2WAY |
| NegotiationDone | EXCH |
| ExchangeDone (when neighbor request list empty) | FULL |
| LoadingDone | FULL |

NSM TCP Direct Update Message

The TCP direct update messages are used to signal different neighbor's changes, that is: a neighbor's state (as listed in Table 1 above), priority, DD sequence number, designated router, and backup designated router FIG. 11 is a structure of a single neighbor's description. It comprises a neighbor ID, the neighbor's IP address, a field of 'neighbor options', the neighbor's priority, the DD sequence number, the neighbor's designated router and the neighbor's designated back-up router.

On the reception of a message each field will be copied to a neighbor's data structure on a slave. This allows signaling changes not only related to the state of a neighbor but also any other changes like its priority for example.

The TCP direct update messages are sent using TCP protocol for better reliability. A single TCP direct update message can package up more than one neighbor's description. Assuming the structure of the description as depicted above, it is normally feasible to send all the updates for all the neighbors with a single TCP packet per slave. In an extreme case, such as the number of neighbors>60, two TCP packets per slave might be required.

FIG. 12 depicts a TCP direct update message with packaged multiple neighbor descriptions. It comprises an IP header, a TCP header and an OSPF header followed by respective neighbor descriptions each as shown in FIG. 11.

Link State Database Synchronization

The link state database (LSDB) is used to store all network information exchanged between OSPF routers. The SPF algorithm generates routes to be stored in the routing table based on the LSDB content.

The LSDB needs to be synchronized throughout the stack so that each unit can route independently, choosing the same next hop; fail-over scenarios do not require LSDB resynchronization; and the SNMP/CLI/WEB interfaces from master and slave units report consistent data.

To keep LSDB synchronized at run time, one needs to consider LSUpdates and self-originated LSAs since the LSDB can only be modified by the following events:
a) The reception of a new or more recent LSA in LSUpdate packet sent by a neighbor; or
b) The generation of a self-originated LSA.

Detection of snooped LSUpdate packet loss and recovery will be handled by TCP assisted snooping method, while self-originated LSAs will be synchronized across the stack via TCP direct messages sent directly from the master to the slave unit(s) over the cascade. Moreover, to ensure reliable flooding, the maintenance of retransmission lists on slave will also be covered.

Self-Originated LSA

Any LSA generated by the router itself (i.e. the advertising router in the LSA header is the same as the router's router ID) can be regarded as a self-originated LSA. Its generation is triggered by timer, ISM/NSM state changes, modification/ addition/deletion of intra/inter area routes or attachment to a new area. It is normal to receive self-originated LSA in an LSUpdate packet during flooding and the OSPF protocol already has a procedure to deal with the reception of self-originated LSAs.

As shown in FIG. 13, any new LSA created by the master will be transferred directly to the slave via a TCP direct message. Upon receiving this message, the slave will update its LSDB. The slave will ignore snooped self-originated LSA received via the flooding procedure and never generate any LSA.

Self-originated LSAs need to be directly transferred from the master to the slave unit(s) due to time skew between units. There is a chance that the slave will receive a more recent snooped self-originated LSA generated by the master via flooding. In this particular case, the slave will treat this LSA as an old one generated by itself before the last router reset. It will then generate a new instance of this LSA and update its LSDB. This will cause the LSDB out of sync.

Since the slave will not generate any self-originated LSA, if the event which triggers the generation of self-originated LSA happens on the slave but the master dies before it has a chance to send the LSA to the slave, the slave will miss it.

Optimization—Packaging Multiple Self-Originated LSAs

The generation of multiple self-originated LSAs can be triggered by a single event. For example, if a designated router forms a new adjacency with a neighbor, both router and network LSAs will be generated. In order to save cascade bandwidth, multiple self-originated LSAs will be sent in one LSA update TCP direct message from the master to the slave over the cascade.

The master will delay the sending of self-originated LSAs to the slave(s) by one second in order to have more self-originated LSAs packaged into one message.

TCP Assisted Snooping

Figure 14:
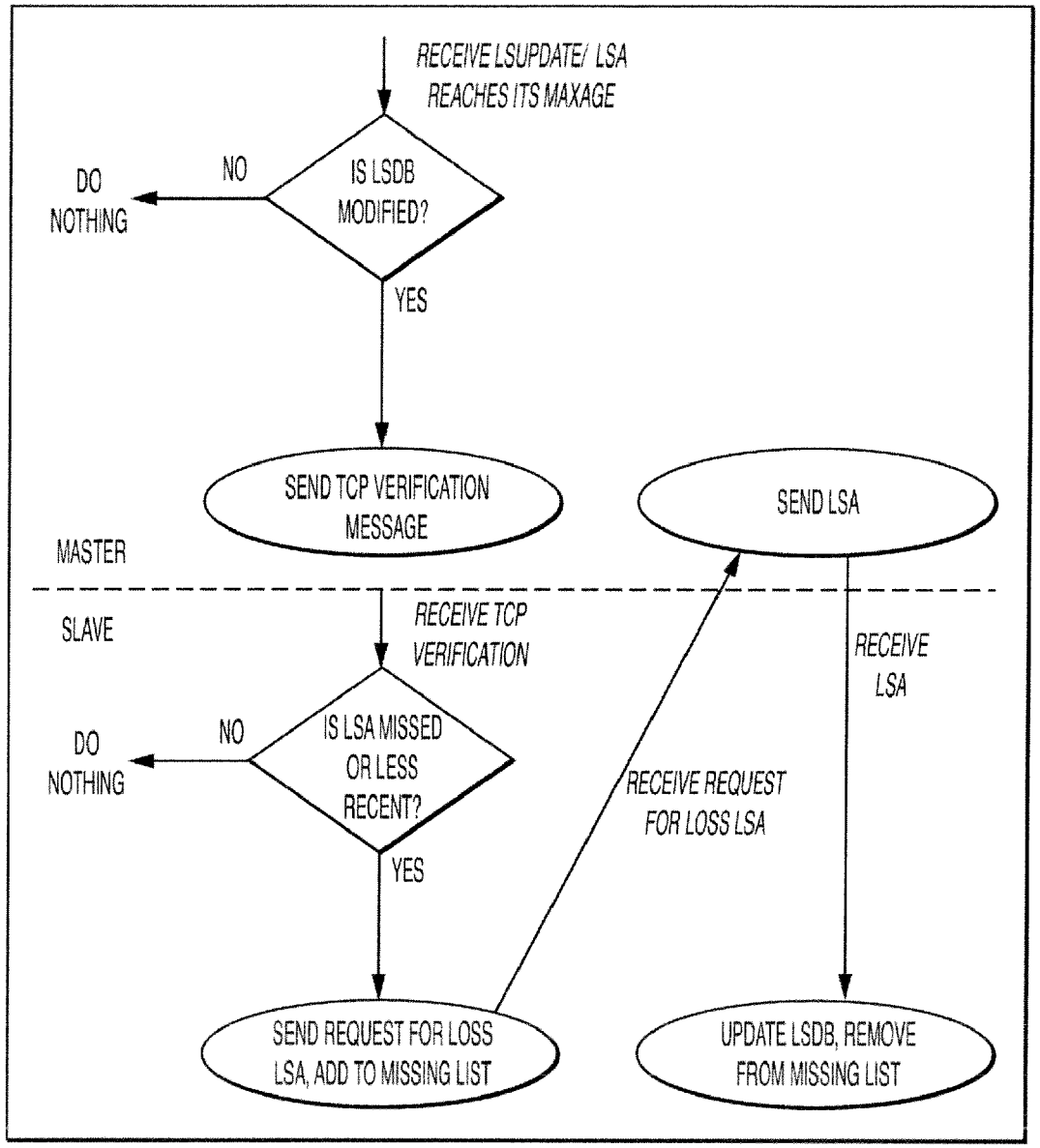
FIG. 14 is a flow diagram of TCP-assisted snooping.

In this method, which is shown in FIG. 14, the slave will snoop on LSUpdate packets to keep its LSDB in sync with that in the master. Differences in LSUpdate packet arrival order between master and slave are not important as long as the maximum number of LSAs supported has not been reached, since OSPF will only take the most recent or new LSA and ignore duplicate or old LSA. The detection of snooped LSUpdate packet loss will be discovered by TCP verification message sent by the master.

A TCP verification message contains only LSA header(s) that modified the master's LSDB, i.e. duplicate or less recent LSA header will not be included in TCP verification message in order to reduce cascade traffic.

TCP is chosen as transport layer protocol because guaranteed delivery ensures that an LSDB will never get out of synchronism.

The following is a sequence of steps for TCP assisted snooping, including packet loss detection and recovery:

(a) the master unit receives a LSUpdate that contains new or more recent LSA(s) and updates its LSDB accordingly;
(b) each slave unit will snoop on the same LSUpdate packet and update the LSDB (this is where packets could be lost on slave);
(c) the master unit will send a verification message (at a later time) containing LSA headers (potentially more than one LSA header per verification message) to each slave unit;
(d) each slave unit will receive the verification message and lookup the LSA in its LSDB;
(e1) if a slave has the same LSA in its LSDB, there is no further processing for that LSA;
(e2) if a slave does not have the LSA in its LSDB or its LSA instance is less recent, the slave will request a full copy of the LSA from the master. The slave will also put this LSA header in a missing LSA request list;
(f) the master unit will send LSAs requested by slave units. Upon receiving those updated LSAs from master, LSDB will be updated and corresponding LSA headers in the missing LSA request list will be removed.

Optimization—Packaging Multiple LSA Headers and Delayed Verification

If a TCP verification message is sent as soon as a new or more recent LSA is received, only one LSA header can be included in a TCP verification message. The problem here is there will be too many TCP acknowledgements. Also, there is overhead to encapsulate a verification message in TCP. To minimize such overhead and cascade bandwidth usage, several LSA headers can be packed into one verification message by delaying its transmission.

There is a possibility that a TCP verification message arrives before the slave has chance to process the corresponding LSA(s) and updates its LSDB. This will cause unnecessary request and recovery messages unless the slave buffers up verification messages. By delaying the sending of verification message, the probability that the above scenario happens will greatly reduce. Any discrepancy between the verification message and the LSA instance in the LSDB on the slave can hence be treated as packet loss.

LSDB Specific Split Protection

To ensure the LSDB is synchronized and that flooding is reliable in cases of fail-over, the following three mechanisms may be employed: missing LSA request list, delayed LSAck and retransmission lists.

Missing LSA Request List

The slave may have some pending requests for loss LSAs which are detected by TCP verification messages but the master dies before the slave receives the updates. Those pending requests should be in the missing LSA request list. After 'stack-split', the new master must request all the LSA on this list by sending LSRequest to its neighbors.

Delayed LSAck

The sending of LSAck, which is used to acknowledge the receiving of LSUpdate, will be delayed (except for duplicate LSUpdate) so that multiple acknowledgements can be sent in one packet. If the master fails after receiving a LSUpdate but before sending out the delayed LSAck, the neighbor (sender of the LSUpdate) will retransmit it at retransmission interval until the new master receives it and sends back a LSAck. Missing the sending of LSAck by the old master at 'stack-split' will not cause any problem and the protocol has a built-in mechanism that can take care of this scenario.

Retransmission List

During the flooding procedure, LSAs will be flooded out some subset of the router's interfaces and put on the retransmission lists. If a LSAck is received within the retransmission interval, the corresponding LSA in the retransmission list will be deleted, otherwise the LSA will be retransmitted until a LSAck is received.

The slave does not need to keep the retransmission lists since it is not responsible for the retransmission of LSAs. However, a new master will not be able to retransmit LSAs to neighbors in case they are lost during 'stack-split'. To ensure reliable flooding, retransmission lists should be kept on the slave.

Keeping the retransmission lists on the slave is not difficult since a LSA will be added to the list when a new LSA instance is received, and a LSA instance will be removed when a snooped LSAck is received. The only problem is that if a snooped LSAck is lost on the slave, the LSA instance on the retransmission list will never be deleted.

The solution is that instead of re-transmitting the LSA, remove it from the retransmission list when the retransmission timer expires on the slave. The retransmission timer will also be set to acknowledgement dead interval, which is a multiple of retransmission interval and its exact value will be the interface's dead interval. The assumption here is that LSAck should be received from neighbor within the acknowledgement dead interval. If there is no LSAck seen for this interval, the snooped LSAck is assumed to be lost. With this method, handling of snooped LSAck is simple and synchronization of LSAck across the stack can be eliminated.

The retransmission timer will be reset back to retransmission interval if the slave takes over as a master and LSAs on the retransmission list will be retransmitted until LSAck is received.

Types of TCP Direct Messages for Database Synchronization

TCP direct messages used in LSDB synchronization can be divided into three types according to their usage:
(a) a verification message;
(b) a request for loss LSUpdate message; and
(c) a new LSA update message. The content, sender and usage are shown in Table 2 below.

TABLE 2

| Message Type | Content | Sender | Usage |
| --- | --- | --- | --- |
| Verification | LSA header(s) | Master | LSUpdate packet loss detection |
| Request for loss LSUpdate | LSA header(s) | Slave | Request for loss LSUpdate |
| New LSA update | Whole LSA(s) | Master | Recovery of loss LSUpdate, transferring entire LSDB at merge time and self-originated LSA(s) at any time |

Stack Merge Scenarios

When units are merged, and the new unit being added to the stack becomes the new stack master then all of the IP interfaces on the new master and all of the slaves will go 'down'. When all of the P interfaces go down, all of the OSPF Interfaces go down. As a result, all of the OSPF adjacencies are broken. Thus, there is no dynamic OSPF data to synchronize. For this case, the OSPF protocol is restarted and the stack converges with the rest of the network as though it was a brand new router.

In the case when units are merged and the new unit being added to the stack becomes a slave, then the master-slave unit synchronization process will take place. The focus of this section is to describe this process, i.e. the synchronization of the dynamic OSPF data between the master and a new slave.

Figure 15:
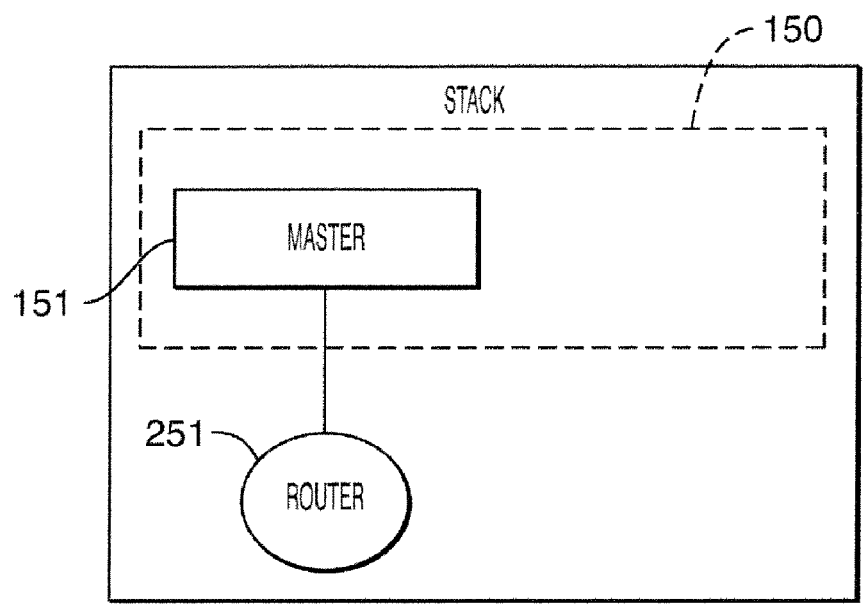
FIGS. 15 to 20 illustrate various stages in a stack merge scenario

The merge scenario begins with one unit in a stack 150, a master unit, e.g. master 151 in FIG. 15. This unit is an OSPF router that is fully adjacent with a neighbor router 251.

Figure 16:
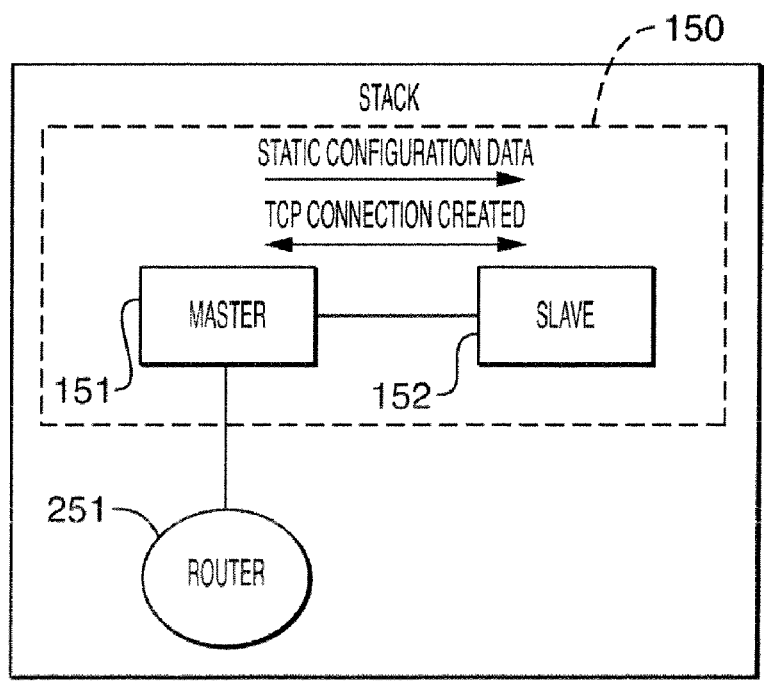

As shown in FIG. 16, a second unit 152 is added to the stack. This new unit becomes a slave when it receives the 'slave event'.

A flag ('LSDB transfer incomplete') is set on the slave indicating that the LSDB transfer is incomplete. This flag is used for two reasons. First, while the LSDB is being transferred we do not want to run the SPF calculation on the slave.

Thus, prior to running SPF, this flag will be checked. Second, if the master unit fails before the entire LSDB is transferred to the slave then this will indicate to the slave (that will be taking over as the master) that the OSPF adjacencies must be broken. This will ensure that the stack is not left in an inconsistent state that is out of sync with the rest of the network.

The static configuration data (interfaces, routing mode, timer data, . . . ) is then synchronized via scripts and utility routines and stored in PDS (as described earlier).

While the static configuration data is being transferred, a new TCP connection to the slave unit will be created.

When the master receives the 'slave ready' signal (see Section 5) from a slave unit, it will begin programming all of the dynamic OSPF data to the slave via TCP direct messages. Note that the master does not receive the 'slave ready' signal until the static configuration has completed.

Because the IP interfaces on the master and the slave(s) may go 'up' asynchronously (in the worst case with a delay), the master will dictate the OSPF interface state on the slave(s), regardless of the EP interface state on the slave.

The master will keep track of the state of the transfer of the OSPF dynamic data for each slave. The transfer will begin with a TCP direct message that will include the state of each OSPF interface, i.e. the entire interface state machine (ISM). This will set the state of the transfer on the master to 'ISM complete'.

Figure 17:
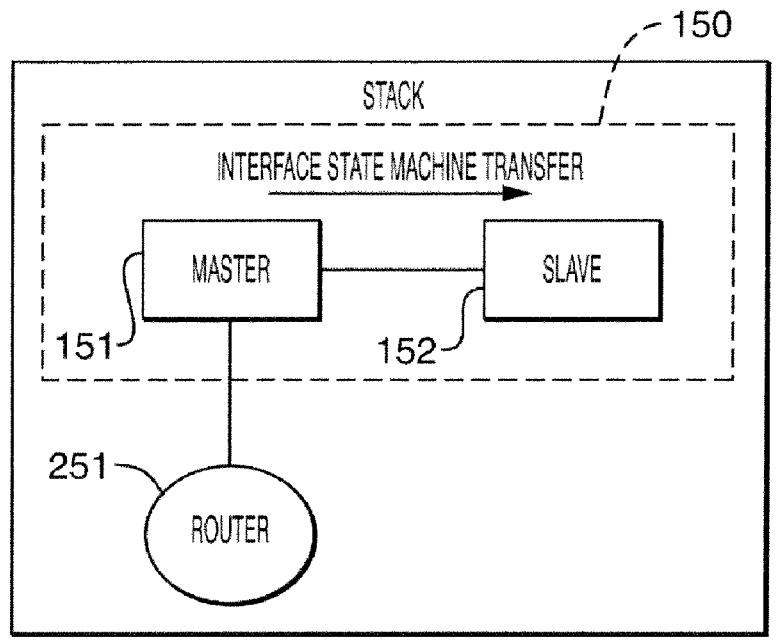

Now, as shown in FIG. 17, the interface state machine data is sent from the master 151 to the slave 152.

Figure 18:
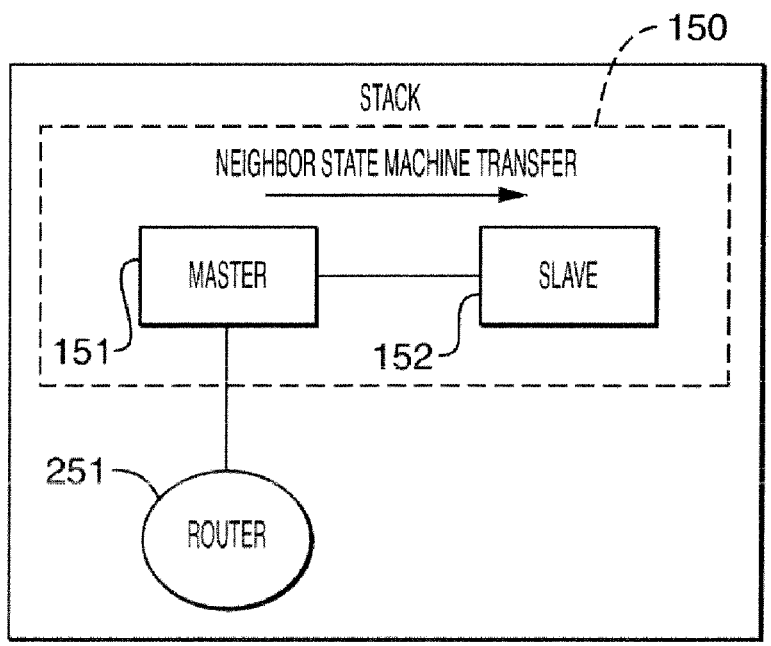

Next, the entire neighbor state machine (NSM) is transferred to the slave as shown in FIG. 18. This transfer will take either one or two TCP direct messages (depending on the number of neighbors that are configured). After the NSM is transferred the state of the transfer on the master will be set to 'NSM complete'.

Figure 19:
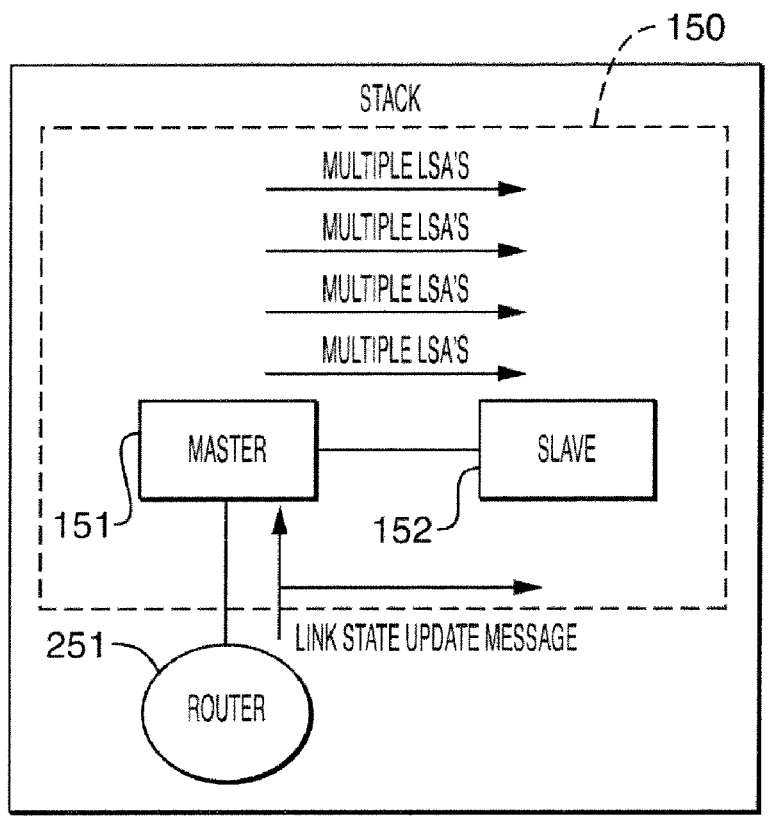

The LSDB is made up of link state advertisements (LSAs) corresponding to specific areas and external routes. TCP direct messages will be sent from the master to the slave as shown in FIG. 19, each including multiple link state advertisements. The master is responsible for keeping track of how much of the LSDB has been sent to the slave. The master will continue sending messages to the slave until all LSAs have been sent. (Note that the self-originating LSAs are included in the LSDB; therefore do not need to be transferred independently during the merge.)

If a new LSA packet arrives while the master is transferring, it will be processed as if the transfer were not currently in progress, i.e. the slave will still snoop on the new LSUpdate packet coming from router 251 and the verification message will be sent by the master. In other words, TCP assisted snooping can take place while the LSDB is being transferred. It doesn't matter whether the LSA instance in the snooped LSUpdate packet or the LSA instance that was transferred arrives first. The slave will only place the most recent version into its LSDB and ignore any duplicate or older version received.

Figure 20:
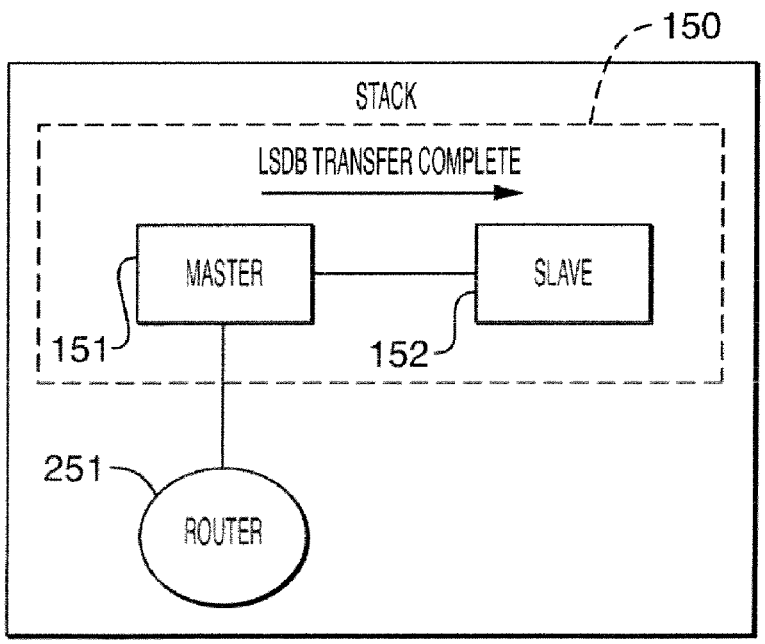

After the last set of LSAs has been sent, the master will send a 'LSDB transfer complete' message (FIG. 20) to the slave and set the state of the transfer to 'LSDB complete'. When the slave receives the 'LSDB transfer complete' it will clear the 'LSDB transfer incomplete' flag and schedule the SPF to run. This flag indicates that the slave is completely in sync with the master and is able to take over in the case of a master failure without reforming neighbor adjacencies. Clearing this flag completes the synchronization of the LSDB for the new slave.

While the merge is taking place, the OSPF protocol on the master will run as described in the rest of this document. So, for example, if a Hello packet is received by the master which results in a change in the neighbor data structure on the master, the corresponding TCP direct update message will still be sent to the slave (regardless of the state of the merge). In the same way, if there is a change in the interface state machine on the master in the midst of synchronizing with the slave it will result in a TCP direct message being sent to the slave.

At any time, if an IP interface goes 'up' on the slave, the SPF will be scheduled to run on the slave. This will ensure that the routing tables on the master and the slave(s) are in sync (this is required specifically when both units are powered on simultaneously). As mentioned previously, if the LSDB transfer has not completed (i.e. the 'LSDB transfer incomplete' flag is set) the SPF will not be run.

Stack Split Scenarios

A 'stack-split' will cause (as described above) one of four scenarios for units in the stack.

A. Slave Unit Promoted to Master

Promotion to a master state from a non-master state may happen for a number of scenarios (most notably, a 'stack-split' but, also in the event of master unit power loss or cascade failure.) For these scenarios, Layer3 stacking configuration dictates the process for return to master operation. OSPF will receive the Layer3 master event and perform the following functions in order to assume master operation.

For OSPF, promotion to master operation from slave operation requires the following actions to take place on the unit:
(i) OSPF protocol message sending will resume.
(ii) OSPF protocol message receipt will resume for all packet.
(iii) Reset retransmission timer from acknowledgement dead interval back to retransmit interval.
(iv) Request LSAs that are on the missing LSA list.
(v) Old TCP connection to master unit will be removed.
(vi) New TCP connection(s) to slave unit(s) will be created.
(vii) Adjacencies will be reformed for neighbors in a state less than 'full'.
(viii) Adjacencies will be reformed if only a partial LSDB transfer has occurred (a split happens before a merge steady state is achieved noted by the LSDB transfer complete flag).

B. Master Unit Loses Slave

This scenario also requires functional consideration. Any time a master unit loses a slave nit the old TCP connection to slave unit must be removed C. Save Unit Synchronizes to New Master This scenario does not require discussion because the sequence of events that take place are similar to those for synchronization to master. However, an additional consideration for this specific scenario is that the old TCP connection to master unit must be removed.

D. Slave Unit Loses Slave

This scenario does not require discussion, as no functional changes are required of a slave unit that loses another slave unit within the stack. This scenario and the previous one do not occur in a two-unit stack.

Packet Loss Scenarios

The retransmission and acknowledgement mechanism in OSPF guarantee that the master will recover from packet loss. Messages used to synchronize the ISM, NSM and LSDB are sent via TCP and hence delivery is also guaranteed. Thus, only packet loss on slave will be taken into consideration and the discussions in this section will be confined to slave only, unless stated otherwise.

There are five types of OSPF packets:
1. Hello
2. Database description
3. Link state request
4. Link state update
5. Link state acknowledgement Hello, database description and link state request packets will not be snooped on the slave unit(s) (see neighbor state machine synchronization for more details) and hence no packet loss scenarios need to be considered. Brief functions and packet loss scenarios for link state update and link state acknowledgement will be discussed below.

Link State Update (LSUdate)

A link state update packet contains a new set of LSAs and is flooded one hop further away from its point of origination. The building of an LSDB is solely based upon the reception of LSupdate from neighbors and the generation of self originated LSAs.

In order to keep the LSDB synchronized, a slave will snoop on LSUpdate packets. Loss in LSUpdate packet may result in LSDB out of sync. A method called TCP assisted snooping will detect and recover from LSUpdate packet loss at run time. At merge time, the whole LSDB will be transferred from the master to the slave. Any new LSUpdate packet loss during transferring will also be caught and handled by TCP assisted snooping.

TCP assisted snooping is theoretically vulnerable to the scenario of snooped LSUpdate loss immediately before master unit failure. However, the likelihood of this scenario happening is very small. Moreover, if the packet loss is only a LSA refresh packet (i.e. only the sequence number is different, the content is the same), the corresponding route in the routing table would not be changed. If the packet loss is an update one, the new master has to wait LSA refresh interval (30 minutes) for another update.

The above scenario can be completely prevented at the expenses of slower protocol convergence and more complicated design, but such complete prevention is not necessary.

Link State Acknowledgement (LSAck)

LSAck is used to acknowledge the reception of LSAs in LSUpdate packet. Upon receiving an LSAck, the retransmission of the corresponding LSAs will be stopped and the LSAs are removed from the retransmission list. Retransmission of LSUpdate and LSAck ensure the flooding procedure is reliable.

The slave will snoop on LSAck to maintain its retransmission lists. Loss of snooped LSAck will result in LSA never be removed from the retransmission list until the adjacency is broken, though the LSA will not be retransmitted on the slave. LSAck is assumed to be received within the acknowledgement dead interval (It is a multiple of retransmission interval and its exact value will be the interface's dead interval) and if not, the corresponding LSA will be removed from the retransmission list. See retransmission list section for more details.

In conclusion, only LSUpdate and LSAck are snooped and their losses will be handled by TCP assisted snooping and timer respectively. Other OSPF packets will be dropped and no loss handling is required by a slave. Table 3 summarizes the handling of packet loss.

TABLE 3

| Packet Type | Snooped/Dropped? | How loss is handled |
| --- | --- | --- |
| Hello | Dropped | N/A |
| Database Description | Dropped | N/A |

TABLE 3-continued

| Packet Type | Snooped/ Dropped? | How loss is handled |
|---|---|---|
| Link State Request | Dropped | N/A |
| Link State Update | Snooped | TCP assisted snooping |
| Link State Acknowledgement | Snooped | Removal of corresponding LSA from retransmission list if LSAck is not seen for a acknowledgement dead interval |

In an alternative technique for synchronization, the master would control the ISM and NSM of slave units as previously described but synchronization of the LSDB takes place primarily through the snooping of LS Update packets. Loss of an LS Update packet would be detected by comparing OSPF Area Checksums between the master and slave units. If the checksums differ a recovery procedure is initiated. This technique may have utility in smaller networks.

The communications mechanism used to transfer data between the master and slave unit(s) is not limited to TCP. Any protocol that includes a mechanism that can detect and recover/retry lost packets may be used to encapsulate LS Updates received and send them to the slave units.

We claim:

1. A method of operating a slave router in a stack of network routers which are interconnected and organised to constitute a single routing entity, said routers comprising a single master router and at least one slave router, wherein each of the routers is capable of performing fully a routing protocol, the method comprising:
    causing the slave router to snoop net update messages from neighbors of a master router, only said master router fully performing said routing protocol, only said master router generating and transmitting net advertisements in accordance with said routing protocol and receiving all types of net database update messages from its neighbors;
    receiving from the master router verification data representing an incremental update of the master router's net database;
    making a comparison of verification data with corresponding data in the slave router's net database so as to determine whether said slave router's net database is synchronized with the master router's net database; and
    requesting a net advertisement from said master router if said comparison indicates that the net database of the slave router is not synchronized with said master router's net database.

2. The method as in claim 1 wherein each of the routers has respective protocol state machinery, the method further comprising:
    receiving direct update messages from the master router which cause the respective protocol state machinery in the slave router to operate in synchronization with the respective protocol state machinery of said master router.

3. The method as in claim 1 wherein said routing protocol is a distance vector routing protocol.

4. The method as in claim 1 wherein said routing protocol is a link state routing protocol.

5. The method as in claim 4 wherein said routing protocol is an open shortest path first (OSPF) routing protocol.

6. The method as in claim 4 wherein said verification data comprises headers of link state advertisements.

7. The method as in claim 1 wherein the verification data is communicated by a transmission control protocol.

8. The method as in claim 1 wherein said verification data comprises an open shortest path first (OSPF) area checksum.

9. A method of operating a router comprising a master unit and a slave unit, wherein the master unit and the slave unit communicate link state advertisements via a transmission control protocol, the method comprising:
    the router receiving a link state update containing a given link state advertisement, wherein the master unit receives the link state update and the slave unit does not receive the link state update;
    in response to receiving the link state update, the master unit updating a master unit link state database with the given link state advertisement;
    the master unit sending a verification message to the slave unit, wherein the verification message contains a link state advertisement header, wherein the link state advertisement header maps to the given link state advertisement in the master unit link state database;
    in response to receiving the verification message, the slave unit looking up the given link state advertisement in a slave unit link state advertisement database;
    as a result of looking up the given link state advertisement, the slave unit:
        determining that the given link state advertisement is not present in the slave unit link state advertisement database,
        placing the link state advertisement header in a missing list, and
        requesting the given link state advertisement from the master unit;
    in response receiving the request for the given link state advertisement, the master unit transmitting the given link state advertisement to the slave unit; and
    the slave unit updating the slave unit link state advertisement database with the given link state advertisement and removing the link state advertisement header from the missing list.

* * * * *

UNITED STATES PATENT AND TRADEMARK OFFICE
CERTIFICATE OF CORRECTION

| | | |
|---|---|---|
| PATENT NO. | : 7,916,757 B2 | Page 1 of 1 |
| APPLICATION NO. | : 12/329776 | |
| DATED | : March 29, 2011 | |
| INVENTOR(S) | : Jane A. Riegel et al. | |

It is certified that error appears in the above-identified patent and that said Letters Patent is hereby corrected as shown below:

In column 24, line 46, in Claim 9, after "response" insert -- to --.

Signed and Sealed this
Third Day of January, 2012

David J. Kappos
*Director of the United States Patent and Trademark Office*